United States Patent
Wong et al.

(10) Patent No.: US 10,268,523 B2
(45) Date of Patent: Apr. 23, 2019

(54) SYSTEM AND METHOD FOR OPERATING A SERVER FARM

(71) Applicant: City University of Hong Kong, Kowloon (HK)

(72) Inventors: Wing Ming Eric Wong, Kowloon (HK); Jing Fu, Kowloon (HK); Jun Guo, Kowloong (HK); Moshe Zukerman, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 104 days.

(21) Appl. No.: 15/067,370

(22) Filed: Mar. 11, 2016

(65) Prior Publication Data

US 2017/0262317 A1    Sep. 14, 2017

(51) Int. Cl.
*G06F 9/46*    (2006.01)
*G06F 9/50*    (2006.01)

(52) U.S. Cl.
CPC ............ *G06F 9/5094* (2013.01); *Y02D 10/22* (2018.01); *Y02D 10/24* (2018.01); *Y02D 10/36* (2018.01)

(58) Field of Classification Search
None
See application file for complete search history.

(56) References Cited

U.S. PATENT DOCUMENTS

| | | | | |
|---|---|---|---|---|
| 8,751,844 B2 * | 6/2014 | Mazzaferri | ........... | G06F 1/3203 713/300 |
| 2008/0141048 A1 * | 6/2008 | Palmer | ................ | H04L 67/1008 713/300 |
| 2009/0187782 A1 * | 7/2009 | Greene | .................. | G06Q 10/00 713/340 |
| 2009/0228726 A1 * | 9/2009 | Malik | ................... | G06F 1/3203 713/320 |
| 2012/0054771 A1 * | 3/2012 | Krishnamurthy | ..... | G06F 9/4881 718/105 |
| 2012/0317578 A1 * | 12/2012 | Kansal | .................. | G06F 9/5077 718/104 |

(Continued)

OTHER PUBLICATIONS

Rosberg et al. Insenstivie Job Assignment With Throughput and Energy Criteria for Processor-Sharing Server Farm, IEEE/ACM, Aug. 2014, pp. 1257-1270.*

(Continued)

*Primary Examiner* — Diem K Cao
(74) *Attorney, Agent, or Firm* — Renner Kenner Greive Bobak Taylor & Weber

(57) ABSTRACT

A method for operating a server farm with a plurality of servers operably connected with each other includes the steps of: sorting the plurality of servers according to a respective energy efficiency value associated with each of the plurality of servers; defining a virtual server by selectively joining two or more of the servers with the highest energy efficiency values; receiving a job request of a computational task to be handled by the server farm; and assigning the computational task to one of the plurality of servers for processing based on a job assignment policy, the job assignment policy being arranged to give preference to assigning the computational task to the servers of the virtual server for processing so as to maximize an energy efficiency of the server farm.

22 Claims, 8 Drawing Sheets

(56) References Cited

U.S. PATENT DOCUMENTS

2014/0006534 A1\* 1/2014 Jain ..................... G06F 9/5094
709/208
2017/0255240 A1\* 9/2017 Matteson ................. G06F 1/26

OTHER PUBLICATIONS

Fu et al, Energy-Efficient Heuristics for Insenstive Job Assignment in Processor-Sharing Server Farms, IEEE, 2015, pp. 2878-2891.\*

\* cited by examiner

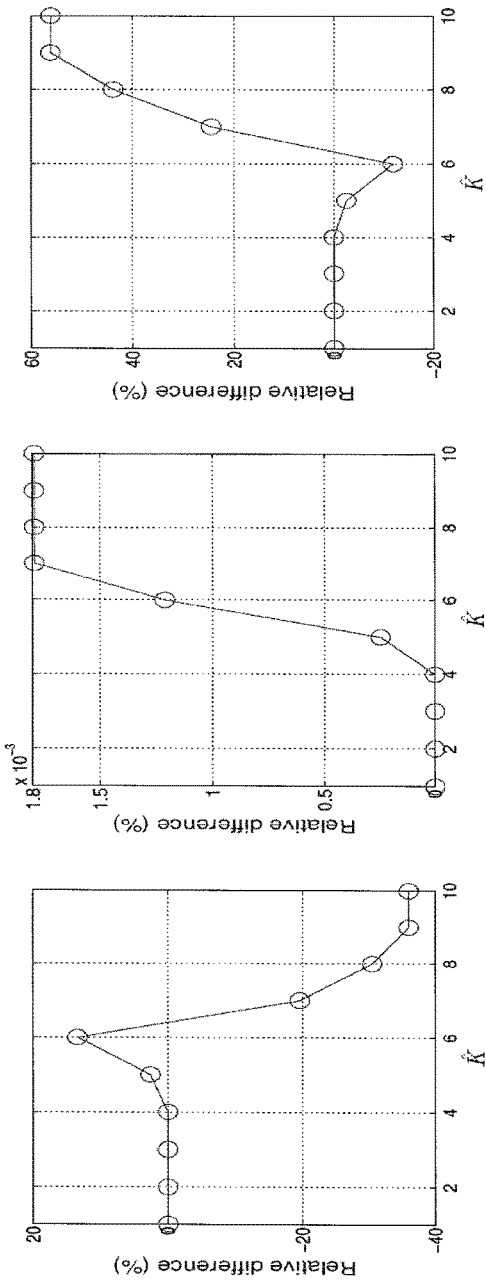
Figure 4A
Figure 4B
Figure 4C
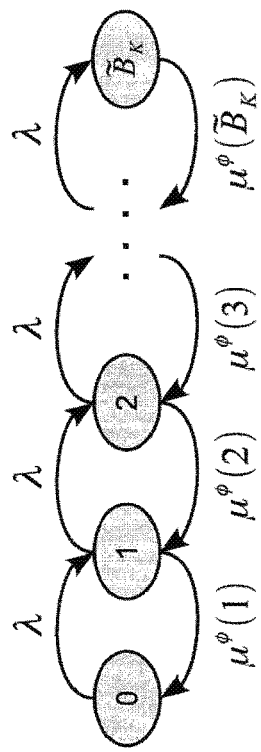
Figure 5

SYSTEM AND METHOD FOR OPERATING A SERVER FARM

TECHNICAL FIELD

The present invention relates to a system and method for operating a server farm and particularly, although not exclusively, to an energy-efficient heuristics for insensitive job assignment in processor-sharing server farms.

BACKGROUND

Data centres with server farms are essential to the functioning of information handling systems in different applications and sectors in the modern economy. Generally, server farms in data centres include a large number of servers that consume power during operation to process and handle jobs or computational tasks. Energy efficiency, often defined as the ratio of job throughput to power consumption, is an important factor to consider when designing or operating server farms, as excessive power consumption in server farm may cause unnecessary greenhouse gas emissions and/or other environmental concerns. Driven by the green data centre initiative to facilitate a low carbon economy in the information age, there is a strong incentive for server farm operators to devise an optimal strategy in operating and managing server farms so as to conserve energy and maximize energy efficiency of server farms.

SUMMARY OF THE INVENTION

In accordance with a first aspect of the present invention, there is provided a method for operating a server farm with a plurality of servers operably connected with each other, comprising the steps of: sorting the plurality of servers according to a respective energy efficiency value associated with each of the plurality of servers; defining a virtual server by selectively joining two or more of the servers with the highest energy efficiency values; receiving a job request of a computational task to be handled by the server farm; and assigning the computational task to one of the plurality of servers for processing based on a job assignment policy, the job assignment policy being arranged to give preference to assigning the computational task to the servers of the virtual server for processing so as to maximize an energy efficiency of the server farm. In one example, these steps may not be performed in the order as listed. For example, the step of sorting the servers and defining the virtual server can be performed after the job request is received. In the present application, the term server farm could refer to an individual server farm, or a cluster of server farms that are operably connected with each other.

In one embodiment of the first aspect, the method further comprises the steps of: monitoring a number or a rate of job request of computational task received; and updating a definition of the virtual server by adjusting the number of servers defining the virtual server based on the monitoring result.

In one embodiment of the first aspect, the plurality of servers each includes a finite buffer for queuing job requests, and the server farm is finite-buffer processor-sharing server farm.

In one embodiment of the first aspect, the job assignment policy is arranged to give preference to assigning the computational task to one of the servers of the virtual server with at least one vacant slot in its buffer.

In one embodiment of the first aspect, the job assignment policy is arranged to reassign a computational task being handled by one of the plurality of servers (e.g., server A) to another one of the plurality of servers (e.g., server B) that is more energy-efficient, before the computational task (being handled by server A) is completed. Preferably, there is a task completion at the other of the plurality of servers (e.g., server B), or a task reassignment, before the computational task (being handled by server A) is completed.

In one embodiment of the first aspect, the job assignment policy is arranged to reassign a computational task being handled by a server in the virtual server to another server in the virtual server with buffer vacancy before the computational task is completed.

In one embodiment of the first aspect, the job assignment policy is arranged to ensure that none of the servers of the virtual server is idle if a server with a lower energy efficiency value in the virtual server is busy.

In one embodiment of the first aspect, the job assignment policy is arranged to ensure that none of the servers of the virtual server handles more than one computational task if any of the servers of the virtual server is idle.

In one embodiment of the first aspect, the job assignment policy is arranged to ensure that none of the servers other than those of the virtual server is busy if a server with a higher energy efficiency value has at least one vacant slot in its buffer.

In one embodiment of the first aspect, the virtual server is formed by at least two servers with the highest efficiency values in the server farm.

In one embodiment of the first aspect, the number of servers of the virtual server is selected such that an aggregate service rate of the virtual server is less than or equal to an arrival rate of the job requests; the aggregate service rate of the virtual server being defined as a sum of service rate of each server in the virtual server.

In one embodiment of the first aspect, the number of servers of the virtual server is selected such that an aggregate service rate of the virtual server substantially matches an average arrival rate of the job requests; the aggregate service rate of the virtual server being defined as a sum of service rate of each server in the virtual server. Preferably, "matches" means that the aggregate service rate is equal to or close to but not larger than the job arrival rate.

In one embodiment of the first aspect, the energy efficiency value of a server is defined by a service rate of the server divided by an energy consumption rate of the server.

In accordance with a second aspect of the present invention, there is provided a system for operating a server farm with a plurality of servers operably connected with each other, the system comprising one or more processors arranged to: sort the plurality of servers according to a respective energy efficiency value associated with each of the plurality of servers; define a virtual server by selectively joining two or more of the servers with the highest energy efficiency values; receiving a job request of a computational task to be handled by the server farm; and assign the computational task to one of the plurality of servers for processing based on a job assignment policy programmed to be operated in the one or more processors, the job assignment policy being arranged to give preference to assigning the computational task to the servers of the virtual server for processing so as to maximize an energy efficiency of the server farm.

In one embodiment of the second aspect, the one or more processors are further arranged to: monitor a number or a rate of job request of computational task received; and update a definition of the virtual server by adjusting the number of servers defining the virtual server based on the monitoring result.

In one embodiment of the second aspect, the plurality of servers each includes a finite buffer for queuing job requests, and the server farm is finite-buffer processor-sharing server farm.

In one embodiment of the second aspect, the job assignment policy is arranged to give preference to assigning the computational task to one of the servers of the virtual server with at least one vacant slot in its buffer.

In one embodiment of the second aspect, the job assignment policy is arranged to reassign a computational task being handled by one of the plurality of servers (e.g., server A) to another one of the plurality of servers (e.g., server B) that is more energy-efficient, before the computational task (being handled by server A) is completed. Preferably, there is a task completion at the other of the plurality of servers (e.g., server B), or a task reassignment, before the computational task (being handled by server A) is completed.

In one embodiment of the second aspect, the job assignment policy is arranged to reassign a computational task being handled by a server in the virtual server to another server in the virtual server with buffer vacancy before the computational task is completed.

In one embodiment of the second aspect, the job assignment policy is arranged to ensure that none of the servers of the virtual server is idle if a server with a lower energy efficiency value in the virtual server is busy.

In one embodiment of the second aspect, the job assignment policy is arranged to ensure that none of the servers of the virtual server handles more than one computational task if any of the servers of the virtual server is idle.

In one embodiment of the second aspect, the job assignment policy is arranged to ensure that none of the servers other than those of the virtual server is busy if a server with a higher energy efficiency value has at least one vacant slot in its buffer.

In one embodiment of the second aspect, the virtual server is formed by at least two servers with the highest efficiency values in the server farm.

In one embodiment of the second aspect, the number of servers of the virtual server is selected such that an aggregate service rate of the virtual server is less than or equal to an arrival rate of the job requests; the aggregate service rate of the virtual server being defined as a sum of service rate of each server in the virtual server.

In one embodiment of the second aspect, the number of servers of the virtual server is selected such that an aggregate service rate of the virtual server substantially matches an average arrival rate of the job requests; the aggregate service rate of the virtual server being defined as a sum of service rate of each server in the virtual server. Preferably, "matches" means that the aggregate service rate is equal to or close to but not larger than the job arrival rate.

In one embodiment of the second aspect, the energy efficiency value of a server is defined by a service rate of the server divided by an energy consumption rate of the server.

In one embodiment of the second aspect, the one or more processors are one or more servers in the server farm.

In accordance with a third aspect of the present invention, there is provided a non-transient computer readable medium for storing computer instructions that, when executed by one or more processors, causes the one or more processors to perform a method for operating a server farm with a plurality of servers operably connected with each other, the method comprising the steps of: sorting the plurality of servers according to a respective energy efficiency value associated with each of the plurality of servers; defining a virtual server by selectively joining two or more of the servers with the highest energy efficiency values; receiving a job request of a computational task to be handled by the server farm; and assigning the computational task to one of the plurality of servers for processing based on a job assignment policy, the job assignment policy being arranged to give preference to assigning the computational task to the servers of the virtual server for processing so as to maximize an energy efficiency of the server farm. These steps may be performed in the order as listed. For example, the step of sorting the servers and defining the virtual server can be performed after the job request is received.

It is an object of the present invention to address the above needs or, more generally, to provide a system and method for implementing an energy-efficient job assignment policy in server farms.

BRIEF DESCRIPTION OF THE DRAWINGS

Embodiments of the present invention will now be described, by way of example, with reference to the accompanying drawings in which:

FIG. 4A is a graph showing a relative difference in energy efficiency of a server farm implementing a E* job assignment policy in one embodiment of the present invention to the same server farm implementing a "most-energy-efficient-server-first (MEESF)" job assignment policy;

FIG. 4B is a graph showing a relative difference in job throughput of a server farm implementing the E* job assignment policy in one embodiment of the present invention to the same server farm implementing the "most-energy-efficient-server-first (MEESF)" job assignment policy;

FIG. 4C is a graph showing a relative difference in power consumption of a server farm implementing the E* job assignment policy in one embodiment of the present invention to that of the same server farm implementing the "most-energy-efficient-server-first (MEESF)" job assignment policy;

FIG. 5 is a state transition diagram of a logically-combined queue for an insensitive jockeying policy;

DETAILED DESCRIPTION OF THE PREFERRED EMBODIMENT

Figure 1:
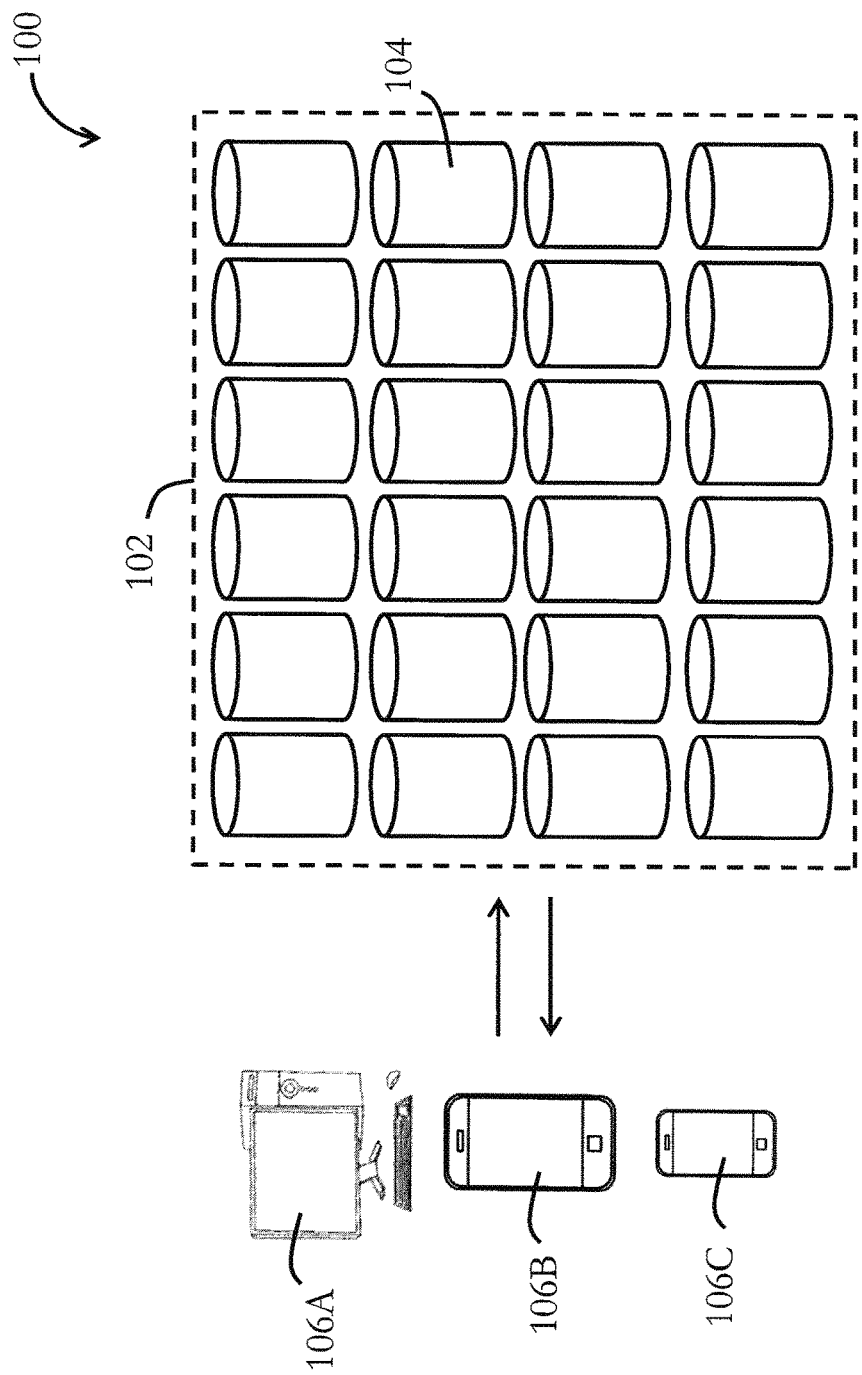
FIG. 1 is a schematic diagram of an operation environment of a server farm in accordance with one embodiment of the present invention.

FIG. 1 shows an operation environment 100 of a server farm in accordance with one embodiment of the present invention. The environment 100 includes a server farm 102 with servers 104 operably connected with each other, for example, through one or more communication links or buses (not shown). Each server 104 is generally an information handling system that is designed to perform computational tasks such as storing, managing, and/or processing information and data. In one embodiment, the server 104 may be any types of device or apparatus that is operable to store, send, receive, and/or forward information and data. The servers 104 in the environment 100 may optionally be connected to other networks, such as the Internet or a cloud-computing network (not shown), for exchanging or retrieving information. In one example, two or more of the servers 104 in the server farm 102 may be linked together to perform computation functions, or they may operate independently. In one example, the server farm could be an individual server farm, or a cluster of server farms that are operably connected with each other.

The environment 100 in FIG. 1 includes computing devices that can be connected to the server over a communication network, such as the Internet or a cloud computing network, for bi-directional communication and information/data exchange. As shown in FIG. 1, the computing device may be a desktop computer 106A, a portable computing device 106B, a mobile device 106C, etc., and can be controlled by a user or by another computing device to perform computation functions. The computing device 106A, 106B, 106C is operable to transmit to a server management module a job request of a computational task to be performed by one or more servers 104 in the server farm 102. In one example, the computational task is to retrieve information stored on or accessible to the servers 104 in the farm 102. In the present embodiment, the server management module may be implemented by one or more processors in the one or more servers 104 of the server farm 102, or by other processing system outside the server farm 102. The server management module may be implemented entirely by hardware resources, entirely by software resources, or by both hardware and software resources. The server management module may be operated by an administration personnel for controlling operation of the server farm 102.

Figure 2:
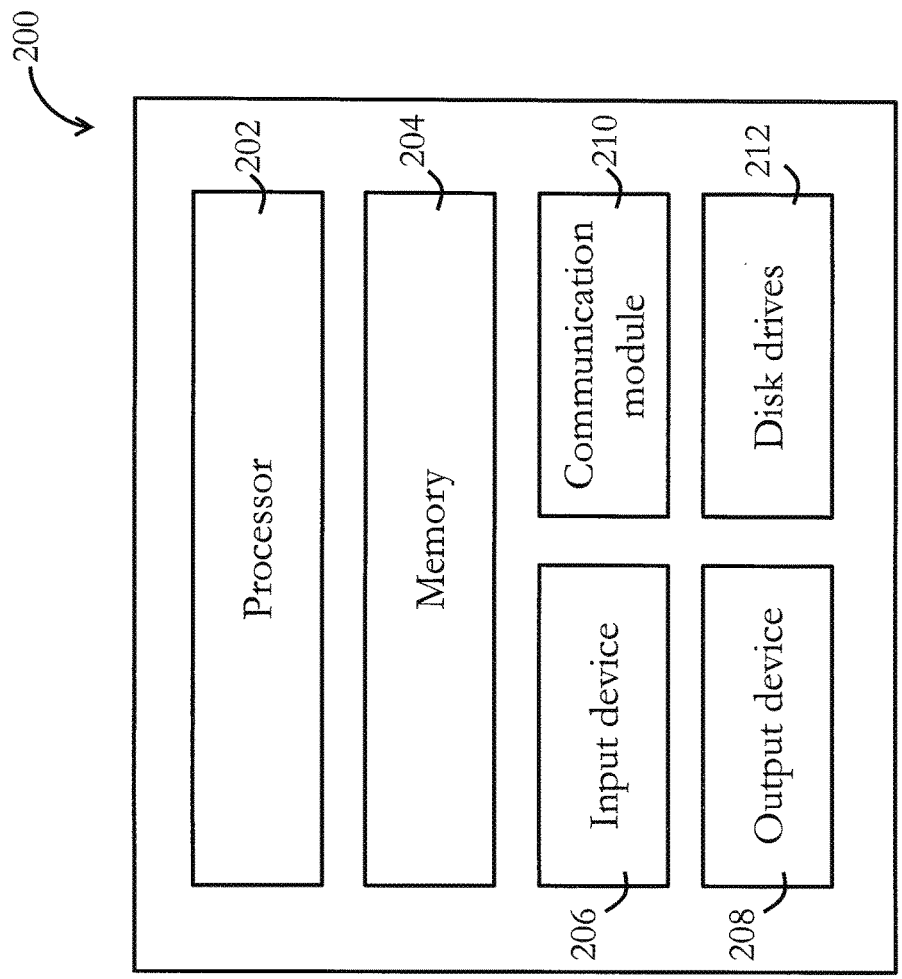
FIG. 2 is a functional block diagram of an information handling system in accordance with one embodiment of the present invention.

Referring to FIG. 2, there is shown a schematic diagram of an exemplary information handling system 200 that can be used as a server or other information processing systems in one embodiment of the present invention. Preferably, the server 200 may have different configurations, and it generally comprises suitable components necessary to receive, store and execute appropriate computer instructions or codes. The main components of the server 200 are a processing unit 202 and a memory unit 204. The processing unit 202 is a processor such as a CPU, an MCU, etc. The memory unit 204 may include a volatile memory unit (such as RAM), a non-volatile unit (such as ROM, EPROM, EEPROM and flash memory) or both. Preferably, the server 200 further includes one or more input devices 206 such as a keyboard, a mouse, a stylus, a microphone, a tactile input device (e.g., touch sensitive screen) and a video input device (e.g., camera). The server 200 may further include one or more output devices 208 such as one or more displays, speakers, disk drives, and printers. The displays may be a liquid crystal display, a light emitting display or any other suitable display that may or may not be touch sensitive. The server 200 may further include one or more disk drives 212 which may encompass solid state drives, hard disk drives, optical drives and/or magnetic tape drives. A suitable operating system may be installed in the server 200, e.g., on the disk drive 212 or in the memory unit 204 of the server 200. The memory unit 204 and the disk drive 212 may be operated by the processing unit 202. The server 200 also preferably includes a communication module 210 for establishing one or more communication links (not shown) with one or more other computing devices such as a server, personal computers, terminals, wireless or handheld computing devices. The communication module 210 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 202, the memory unit 204, and optionally the input devices 206, the output devices 208, the communication module 210 and the disk drives 212 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 200 shown in FIG. 2 is merely exemplary, and that different servers 200 may have different configurations and still be applicable in the present invention.

Figure 3:
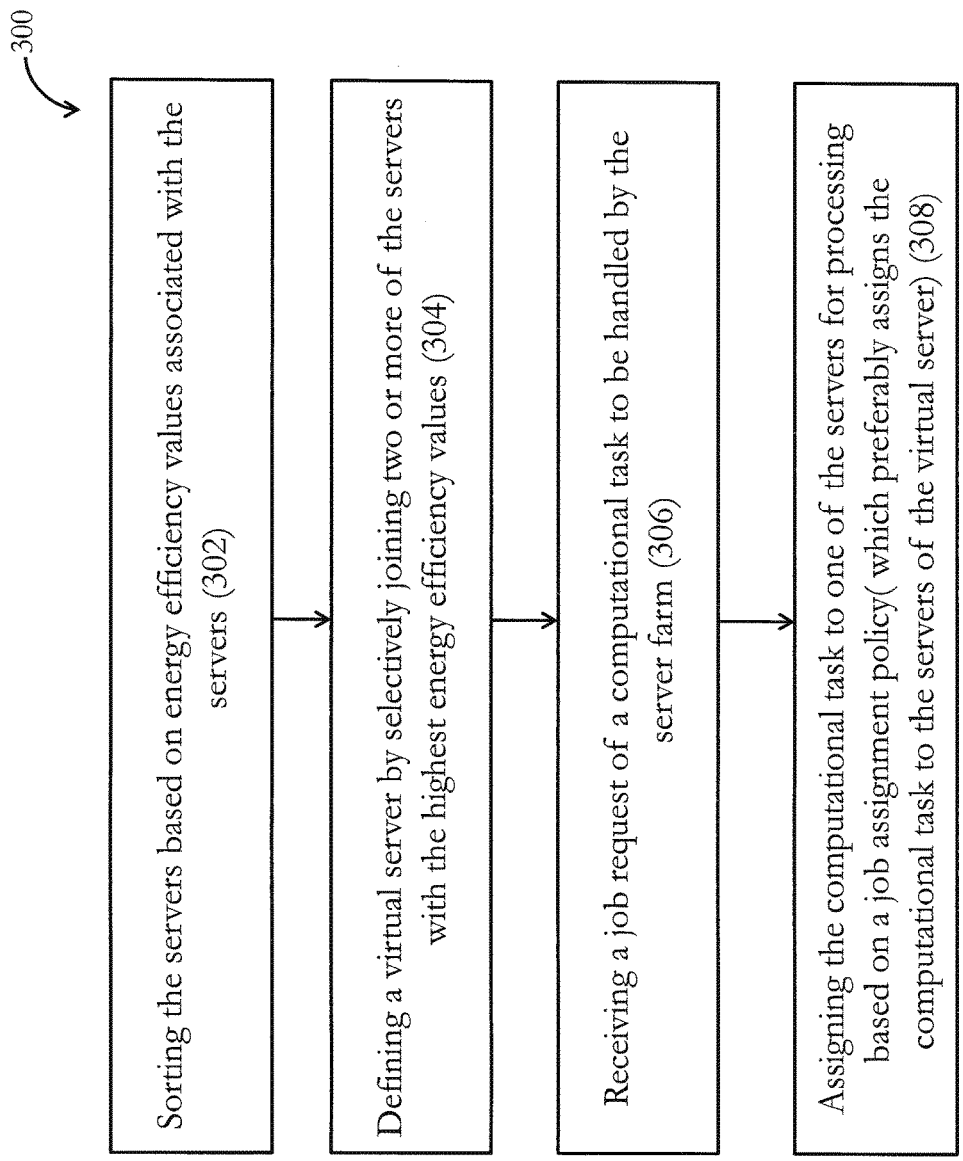
FIG. 3 is a flow diagram illustrating a job assignment policy, also referred to as E* job assignment policy, for operating a server farm in accordance with one embodiment of the present invention.

FIG. 3 illustrates a job assignment policy 300, referred to as E* job assignment policy, for operating a server farm, e.g., the server farm shown in FIG. 1, in accordance with one embodiment of the present invention. The server farm preferably includes a number of servers operably connected with each other. In one embodiment, the servers each include a finite buffer for queuing job requests, and the server farm is finite-buffer processor-sharing server farm. The job assignment policy 300 may be implemented by one or more processors or servers within or outside the server farm. In one embodiment, the one or more processors or servers implementing the E* job assignment policy 300 is first, in step 302, arranged to sort the servers in the server farm based on energy efficiency value, defined as the service rate divided by the energy consumption rate, associated with each server. The one or more processors or servers implementing the E* job assignment policy 300 may maintain a list of servers that can be dynamically updated. It may further maintain a list of jobs, e.g., in the form of a queue, to be handled by the servers. The queue may be a logical combination of buffer queues of each of the servers in the server farm based on job priority and/or time of receipt of the job requests. Then, in step 304, the one or more processors or servers implementing the E* job assignment policy 300 defines a virtual server by selectively joining two or more of the servers with the highest energy efficiency values. For example, the one or more processors or servers implementing the E* job assignment policy 300 may update the list of servers. Upon receiving a job request of a computation task to be handled by the servers in the server farm in step 306, the one or more processors or servers implementing the E* job assignment policy 300 then assigns the computational task to one of the servers in the server farm for processing in step 308. The one or more processors or servers implementing the E* job assignment policy 300 is arranged to give priority to assigning the computational task to a server in the virtual server for processing. The one or more processors or servers implementing the E* job assignment policy 300 may add the new incoming job to the list of jobs. A person skilled in the art would appreciate that the operation sequence of the job assignment policy 300 need not be in the same order as listed. For example, in one embodiment, the step of sorting the servers and defining the virtual server can be performed after the job request is received.

Preferably, the policy 300 is further arranged to monitor a number or a rate of job request of computational task received, and to update a definition of the virtual server by adjusting the number of servers defining the virtual server based on the monitoring result. In the present invention, the virtual server defined in the E* job assignment policy 300 is formed by at least two servers with the highest efficiency values in the server farm. In a preferred embodiment, the number of servers of the virtual server is selected such that an aggregate service rate of the virtual server, defined as a sum of service rate of each server in the virtual server, is less than or equal to an arrival rate of the job requests. In a more preferred embodiment, the number of servers of the virtual server is selected such that an aggregate service rate of the virtual server substantially matches an average arrival rate of the job requests. The word "matches" preferably means that the aggregate service rate is equal to or close to but not larger than the job arrival rate. In one embodiment, the E* job assignment policy 300 is further arranged to give preference to assigning the computational task to one of the servers of the virtual server with at least one vacant slot in its buffer. In a preferred embodiment, the E* job assignment policy 300 is further arranged to reassign a computational task being handled by one of the plurality of servers (e.g., server A) in the server farm to another one of the plurality of servers (e.g., server B) that is more energy-efficient, before the computational task (being handled by server A) is completed. The other server (e.g., server B) may become more energy efficient as it completes its outstanding task(s) when the original server (e.g., server A) is handling the computational task. Alternatively, a task reassignment may occur when the original server (e.g., server A) is handling the computational task. In this case, the computational task being handled by the original server (e.g., server A) is reassigned to the other server (e.g., server B) for handling, regardless of whether the other server (e.g., server B) has any outstanding tasks. In one embodiment, the E* job assignment policy 300 may also reassign a computational task being handled by a server in the virtual server to another server in the virtual server with buffer vacancy before the computational task is completed. The E* job assignment policy 300 may be arranged to ensure that none of the servers of the virtual server is idle if a server with a lower energy efficiency value in the virtual server is busy. The E* job assignment policy 300 may further be arranged to ensure that none of the servers of the virtual server handles more than one computational task if any of the servers of the virtual server is idle. Details of the E* job assignment policy 300 will be explained in further detail below, with reference to FIGS. 4A-12C.

The present invention relates to stochastic job assignment in a server farm. An object of the present invention is to maximize its energy efficiency, defined as the ratio of job throughput to power consumption, of the server farm.

In embodiments of the present invention, the server farm is preferably a parallel system of finite-buffer processor-sharing (PS) queues with heterogeneous server speeds and energy consumption rates. PS queues are suitable for modelling web-server systems. Under PS, all existing jobs at each server share the processing capacity and are served at equal rates. PS enables fair processing of jobs, which is desirable in web-server systems where the file size distribution is known to have high variability.

In embodiments of the present invention, the E* job assignment policy preferably allows "jockeying". When jockeying is permitted, jobs can be reassigned to any server with buffer vacancies at any time before they are completed. Assignment with jockeying has more freedom and suits a server farm where the servers are collocated in a single physical centre and can use e.g. a shared DRAM-storage or flash-storage. It may also suit a data centre with more advanced virtualization technologies that enable high-speed live migration of jobs. Jockeying policies in general can significantly improve the system performance. In addition, they are scalable in computation and hence make resource optimization more tractable.

The Inventors of the present invention has devised through experiments and trials that one heuristic approach for job assignment is to choose the most energy-efficient server for processing computation tasks associated with job requests. However, this approach, also referred to as the most energy-efficient server first (MEESF) job assignment policy, is only able to maximize the ratio of instantaneous job departure rate to instantaneous energy consumption rate in limited cases, and it does not maximize the ratio of long-run average job departure rate (i.e., job throughput) to long-run average energy consumption rate (i.e., power consumption). Compared with the MEESF policy, the E* job assignment policy in embodiments of the present invention is a more robust heuristic policy that outperforms MEESF in terms of improving the energy efficiency of the system.

I—System Model

The following table (Table I) includes definition of symbols used in the following description.

| Symbol | Definition |
|---|---|
| K | Number of servers in the system |
| $B_j$ | Buffer size of server j |
| $\tilde{B}_i$ | Aggregate buffer size of the first i servers in the system |
| $\mu_j$ | Service rate of server j |
| $\varepsilon_j$ | Energy consumption rate of server j |
| $\mu_j/\varepsilon_j$ | Energy efficiency of server j |
| $\lambda$ | Job arrival rate |
| $\hat{K}$ | Number of energy-efficient servers forming a virtual server |
| $\tilde{\mu}_{\hat{K}}$ | Aggregate service rate of the virtual server |
| $\tilde{\varepsilon}_{\hat{K}}$ | Aggregate energy consumption rate of the virtual server |
| $\tilde{\mu}_{\hat{K}}/\tilde{\varepsilon}_{\hat{K}}$ | Energy efficiency of the virtual server |
| $\hat{K}^*$ | Optimal value of $\hat{K}$ chosen by the E* policy |
| $\hat{K}^{RM}$ | Empirical value of $\hat{K}$ chosen by the RM policy |
| $\mathcal{L}^\phi$ | Job throughput of the system under policy $\phi$ |
| $\varepsilon^\phi$ | Power consumption of the system under policy $\phi$ |
| $\mathcal{L}^\phi/\varepsilon^\phi$ | Energy efficiency of the system under policy $\phi$ |

In one embodiment of the present invention, the server farm includes K independent servers, each having a finite buffer for queuing jobs. For j=1, 2, . . . , K, the buffer size of server j is denoted by $B_j$, where $B_j$>1 for all j. For notational convenience, the aggregate buffer size of the first i servers in the system is denoted by $\tilde{B}_i$, given by $$\tilde{B}_i = \sum_{j=1}^{i} B_j, \quad i = 0, 1, \ldots, K \qquad (1)$$

where $\tilde{B}_0=0$ by definition.

The service rate of server j is denoted by $\mu_j$, defined as the units of jobs that can be processed per time unit. The energy consumption rate of server j is denoted by $\varepsilon_j$. In some situations (special case), the energy consumption rate of a server may be related to the server speed by a convex function in the form $$\varepsilon(\mu) \propto \mu^\beta, \beta > 0 \qquad (2)$$

with $\beta=3$. In the present invention, however, embodiments of the E* job assignment policy does not necessarily follow this assumption.

In the model of the present embodiment, the ratio $\mu_j/\varepsilon_j$ is referred to as the energy efficiency of server j. Accordingly, server i is defined to be more energy efficient than server j if and only if $\mu_i/\varepsilon_i > \mu_j/\varepsilon_j$. For convenience of description, in the following, the servers are labelled according to their energy efficiency. That is, for any pair of servers i and j, if i>j, then $\mu_i/\varepsilon_i \geq \mu_j/\varepsilon_j$.

Remark 1:

In the context of the present invention, for i<j, $\mu_i/\varepsilon_i - \mu_j/\varepsilon_j \geq 0$ as $\mu_i/\varepsilon_i \geq \mu_j/\varepsilon_j$.

Preferably (but not necessarily), the jobs (or the job requests for computational tasks or the computation tasks itself) arrive at the system according to a Poisson process with a mean rate $\lambda$. An arriving job may be assigned to one of the servers with at least one vacant slot in its buffer, subject to the control of the E* job assignment policy. If all buffers are full, the arriving job is lost. Preferably, job sizes (in units) are independent and identically distributed with an absolutely continuous cumulative distribution function (CDF) F(x), x≥0. In the following the average size of jobs is normalized to one. Preferably, each server j serves its jobs at a total rate of $\mu_j$, using the PS service discipline.

II. Energy-Efficient Job Assignment

A. MEESF Job Assignment Policy

MEESF job assignment policy is a simple heuristic approach that operates to choose the most energy-efficient server for job assignment. With jockeying, at any point in time, MEESF is required to satisfy the condition that no server in the system is busy if a more energy-efficient server has at least one vacant slot in its buffer. In MEESF, rearrangement of the existing jobs is always required whenever it becomes necessary to satisfy the condition of the policy. The problem with MEESF is that it does not necessarily maximize the ratio of long-run average job departure rate to long-run average energy consumption rate.

B. E* Job Assignment Policy ("E* Policy")

In a preferred embodiment, the E* job assignment policy is arranged to aggregate $\hat{K} \geq 2$ most energy-efficient servers in the server farm to form a virtual server. Let $\tilde{\mu}_{\hat{K}}$ denotes the aggregate service rate of the virtual server, i.e., $$\tilde{\mu}_{\hat{K}} = \sum_{j=1}^{\hat{K}} \mu_j. \qquad (3)$$

Also, let $\tilde{\varepsilon}_{\hat{K}}$ denotes the energy consumption rate of the virtual server, i.e., $$\tilde{\varepsilon}_{\hat{K}} = \sum_{j=1}^{\hat{K}} \varepsilon_j. \qquad (4)$$

Accordingly, the energy efficiency of the virtual server can be expressed as $\tilde{\mu}_{\hat{K}}/\tilde{\varepsilon}_{\hat{K}}$.

Proposition 1:

The virtual server formed by aggregating $\hat{K}$ most energy-efficient servers in the system is not worse than any server k, k≥$\hat{K}$+1, in terms of energy efficiency. That is, $$\frac{\tilde{\mu}_{\hat{K}}}{\tilde{\varepsilon}_{\hat{K}}} \geq \frac{\mu_K}{\varepsilon_K}, k = \hat{K}+1, \hat{K}+2, \ldots, K. \qquad (5)$$

Proof:

$$\frac{\tilde{\mu}_{\hat{K}}}{\tilde{\varepsilon}_{\hat{K}}} - \frac{\mu_k}{\varepsilon_k} = \frac{\sum_{j=1}^{\hat{K}} (\mu_j \varepsilon_k - \varepsilon_j \mu_k)}{\sum_{j=1}^{\hat{K}} \varepsilon_j \varepsilon_k} \geq 0 \qquad (6)$$

since $\mu_j/\varepsilon_j - \mu_k/\varepsilon_k \geq 0$.

In embodiments of the E* job assignment policy, the policy always gives preference to the virtual server and utilizes its service capacity in such a way that guarantees a higher job throughput than what is achievable with MEESF and yet can improve the energy efficiency of the system. In particular, with jockeying, E* is required to satisfy the following two conditions at any point in time:

1) Among the $\hat{K}$ servers that form the virtual server, no server is idle if a less energy-efficient server is busy, and no server has more than one job if another server is idle; and 2) None of the other servers K–$\hat{K}$ in the system is busy if a more energy-efficient server has at least one vacant slot in its buffer.

One property of the E* policy as a result of the above design is that it maximizes the instantaneous job departure rate of the virtual server at any point in time under the condition that it readily chooses the most energy-efficient servers for job assignment among the $\hat{K}$ servers that form the virtual server. In the embodiments of the present invention, decision variable $\hat{K}$ provides a degree of freedom for E* to fine-tune its performance. Thus, an important object of the E* policy is to determine within the range [2, K] an optimal $\hat{K}$ value, denoted by $\hat{K}^*$, for maximizing energy efficiency of the system.

C. RM (Rate Matched) E* Job Assignment Policy ("RM Policy")

In a preferred embodiment of the present invention, the E* job assignment policy is a rate matched E* policy. In this rate matched E* policy, the $\hat{K}^*$ is chosen to be a number $\hat{K}^{RM}$ such that the aggregate service rate of the virtual server matches the job arrival rate. More specifically, $\hat{K}^{RM}$ is chosen to be the largest K satisfying $\tilde{\mu}_{\hat{K}} < \lambda$. Intuitively, this is selected based on the fact that the maximum job throughput of the system is no more than the job arrival rate. As a result, it can be expected that the servers chosen by the RM policy are (largely or roughly) sufficient to support the maximum job throughput.

The following example explains the reason why the rate matched E* policy is an optimal policy, using the numerical results presented in FIGS. 4A-4C, which show the relative differences in energy efficiency/job throughput/power consumption of a server farm implementing a E* job assignment policy in one embodiment of the present invention to the same server farm implementing a "most-energy-efficient-server-first (MEESF)" job assignment policy. In the example, the system includes ten servers; and the server speeds and the energy consumption rates are randomly generated. The job arrival rate is set to be the sum of the service rates of the six most energy-efficient servers. The results in FIGS. 4A-4C are presented in the form of the relative difference of E* to MEESF in terms of each of the corresponding performance measure. Note that in this example, for two numerical quantities x and y, the relative difference of x to y is defined as (x−y)/y.

As can be seen from FIGS. 4A-4C, choosing $\hat{K}$ to be larger than $\hat{K}^{RM}$ would decrease the energy efficiency of the system. This can be explained by the following reasons. Firstly, if a value of $\hat{K}$ larger than $\hat{K}^{RM}$ is chosen, the excessive service capacity made available with the virtual server can increase the job throughput only marginally. However, it can substantially increase the power consumption since it now uses more of those less energy-efficient servers. As a result, the energy efficiency (ratio of job throughput to power consumption) of the system is likely to decrease with an increasing value of $\hat{K}$ within the range $[\hat{K}^{RM}, K]$. Secondly, if a value of $\hat{K}$ smaller than $\hat{K}^{RM}$ is chosen, the aggregate service rate of the virtual server is not sufficient to support the input traffic in a long run. As a result, incoming jobs will be queued up and the system will be forced to use more of those less energy-efficient servers for serving the backlog. This will again increase the power consumption. Since it can be shown that the job throughput decreases with decreasing $\hat{K}$, the energy efficiency is also likely to decrease with a decreasing value of $\hat{K}$, within the range $[\hat{K}^{RM}, 2]$.

III. Insensitive Conditions With Jockeying

In some embodiments, the symmetric queue model with state-dependent service rates defined in "F. P. Kelly, "Networks of queues," Adv. Appl. Probab., vol. 8, no. 2, pp. 416-432, June 1976" is adapted the present invention that allows jockeying among multiple queues.

A. Adaptation of Symmetric Queue

Generally, a symmetric queue is a queue that has a symmetry between the service rate allocated to each position in the queue and the probability that a newly arrived job will join the queue in the corresponding position. In particular, when there are n jobs in the queue, the ordered jobs are contained at positions 1, 2, . . . , n, and the total service rate is $\mu(n)$. A proportion $\gamma(l,n)$ of $\mu(n)$ is directed to the job at position l, where l=1, 2, . . . , n. In one example, when the job at position l completes its service and leaves the queue, the jobs at positions l+1, l+2, . . . n moves to positions l, l+1, . . . , n−1 respectively. When a job arrives at the queue, it moves into position l with probability $\gamma(l,n+1)$. The jobs previously at positions l, l+1, . . . , n moves to positions l+1, l+2, . . . , n+1 respectively.

A stationary symmetric queue is preferably insensitive to the service time distribution, given that it can be represented as a mixture of Erlang distributions. In one case, the canonical insensitive queuing model, the Erlang loss system, can be described as a symmetric queue.

Referring back to the context of the present invention and consider the system of multiple queues, let the number of existing jobs at server j be denoted by $n_j$. Let the total number of existing jobs in the system be denoted by n. By definition, $n=\Sigma_{j=1}^{K} n_j$. Also define a feasible group of server sets $\{\mathcal{T}^\phi(n): 1 \leq n \leq \tilde{B}_K\}$ for each policy $\phi$, where $T^\phi(n)$ is the set of servers designated for serving the existing jobs in the system at state n. For stationary policies, the assignment decisions are made only upon arrivals and departures.

Let the buffer position in the multi-queue system be defined using a 2-tuple notation (j, k) for position k of server j, where $1 \leq j \leq K$; and $1 \leq k \leq B_j$. For each policy $\phi$, a one-to-one mapping $\Theta^\phi$ from the buffer positions in the multi-queue system, defined as $\mathcal{Q}_m = \{(j,k): 1 \leq j \leq K, 1 \leq k \leq B_j\}$, to the buffer positions in the logically-combined queue, defined as $\mathcal{Q}_s = \{l: 1 \leq l \leq \tilde{B}_K\}$, matches the server sets included in $\{\mathcal{T}^\phi(n)\}$. Preferably, there could be more than one such mapping that matches $\{\mathcal{T}^\phi(n)\}$. Since the service discipline at each server is PS, all the relevant mappings associated with the positions of a given server are equivalent. Moreover, because of the insensitivity property of the logically-combined queue, following the symmetric queue construction described in "F. P. Kelly, "Networks of queues," Adv. Appl. Probab., vol. 8, no. 2, pp. 416-432, June 1976", all these mappings give the same stationary distribution of the underlying stochastic process $\{n^\phi(t), t \geq 0\}$.

For any mapping $\Theta^\phi$ of policy $\phi$, the multi-queue system can be implemented as a symmetric queue on the $\mathcal{Q}_s$ domain. This can be shown by deriving the state-dependent service rates of $\mathcal{Q}_s$. With the logically-combined queue, each server j serves only the jobs located at its associated positions using the PS discipline. For policy $\phi$ at state n, the total service rate $\mu^\phi(n)$ is given by:

$$\mu^\phi(n) \stackrel{def}{=} \sum_{j \in \mathcal{T}^\phi(n)} \mu_j. \qquad (7)$$

Under the PS discipline, the proportion of $\mu^\phi(n)$ allocated to the job at position $l \stackrel{def}{=} \Theta^\phi(j,k)$ on the $\mathcal{Q}_s$ domain is equivalent to that allocated to the job at its corresponding position k of server j on the $\mathcal{Q}_m$ domain, is given by $$\gamma^\phi(l, n) = \frac{\mu_j}{n_j \mu^\phi(n)}. \qquad (8)$$

To complete the construction of the logically-combined queue as a symmetric queue, it remains to enforce a symmetry between the service rate allocated to each position in the logically-combined queue and the probability that a newly arrived job will join the queue in the corresponding position. That is:

Firstly, when the job at position $l=\Theta^\phi(j, k)$ with (j, k) being its corresponding position in the multi-queue system completes its service and leaves the logically-combined queue, the jobs at positions l+1, l+2, . . . , n move to positions l, l+1, . . . , n−1, respectively; and secondly, when a job arrives at the logically-combined queue, it is assigned to position l, which corresponds to position (j, k) in the multi-queue system where $l=\Theta^\phi(j, k)$, with probability $\gamma^\phi(l, n\hat{}+1)$. The jobs previously at positions l, l+1, . . . , n move to positions l+1, l+2, . . . , n+1 respectively.

In general, based on the one-to-one position mapping $\Theta^\phi$ from $\mathcal{Q}_m$ to $\mathcal{Q}_s$, the movements of jobs in the multi-queue system match the movements of jobs in the logically-combined queue. Due to the insensitivity property of the symmetric queue, the state transition process of the logically-combined queue in the context of the present embodiment can be modeled as a birth-death process with birth rate $\lambda$ and death rate $\mu^\phi(n)$, $n=1, 2, \ldots, \tilde{B}_K$, as shown in FIG. 5. Accordingly, the stationary distribution $\pi^\phi(n)$ of the process $\{n^\phi(t), t \geq 0\}$, under any insensitive jockeying policy $\phi$, can be obtained by solving the steady-state equations:

$$\lambda \pi^\phi(n) = \mu^\phi(n+1)\pi^\phi(n+1), n=0,1, \ldots, \tilde{B}_K-1, \qquad (9)$$

Then, the job throughput of the system under policy $\phi$, which is equivalent to the long-run average job departure rate, can be obtained as $$\mathcal{L}^\phi = \sum_{n=1}^{\tilde{B}_K} \mu^\phi(n)\pi^\phi(n). \qquad (10)$$

Alternatively, $\mathcal{L}^\phi$ can be obtained as by $$\mathcal{L}^\phi = \lambda[1-\pi^\phi(\tilde{B}_K)]. \tag{11}$$

The power consumption of the system under policy φ, which is equivalent to the long-run average energy consumption rate, can be obtained as $$\varepsilon^\phi = \sum_{n=1}^{\tilde{B}_K} \varepsilon^\phi(n)\pi^\phi(n) \tag{12}$$

where $\varepsilon^\phi(n)$ is the total energy consumption rate at state n, given by $$\varepsilon^\phi(n) \stackrel{def}{=} \sum_{j \in \mathcal{T}^\phi(n)} \varepsilon_j. \tag{13}$$

By definition, $\mathcal{L}^\phi/\varepsilon^\phi$ is the energy efficiency of the system under policy φ.

B. Insensitive MEESF Job Assignment Policy

The insensitive MEESF policy is derived by specifying the set of servers $\mathcal{T}^{MEESF}(n)$ designated for serving the existing jobs in the system at state n as $$\mathcal{T}^{MEESF}(n) = \{1, \ldots, i\}, i \leq n \leq \tilde{B}_K \tag{14}$$

where i≤K is the smallest integer satisfying $\Sigma_{j=1}^i B_j \geq n$. The server sets specified in Equation (14) has defined the MEESF policy, in which the available servers that are most energy efficient are designated for service at each state n.

The position mapping $\Theta^{MEESF}$ of MEESF is defined iteratively as follows. The $B_1$ positions of server 1 (the most energy-efficient server) are mapped to the first $B_1$ positions of the logically-combined queue that are associated with server 1. The $B_2$ positions of server 2 (the second most energy-efficient server) are mapped to the following $B_2$ positions of the logically-combined queue that are associated with server 2. The procedure continues until the $B_K$ positions of server K have been mapped.

C. Insensitive E* Job Assignment Policy

The insensitive E* policy is derived by specifying the set of servers $\mathcal{T}^{E^*}(n)$ designated for serving the existing jobs in the system at state n as $$\mathcal{T}^{E^*}(n) = \{1, \ldots, \min(n, \hat{K})\}, 1 \leq n \leq \tilde{B}_{\hat{K}} - 1 \tag{15}$$

and $$\mathcal{T}^{E^*}(n) = \{1, \ldots, i\}, \tilde{B}_{\hat{K}} \leq n \leq \tilde{B}_K \tag{16}$$

where i≤K is the smallest integer satisfying $$\sum_{j=1}^i B_j \geq n.$$

The server sets specified in Equations (15) and (16) indeed define the E* policy, in which preference is always given to the virtual server at any state n.

In one embodiment of the present invention, the position mapping $\Theta^{E^*}$ of E* is defined iteratively as follows. In the first iteration, the first buffer positions of servers 1, 2, . . . , $\hat{K}$ are mapped to the first $\hat{K}$ positions of the logically combined queue in the order of the server labels 1, 2, . . . , $\hat{K}$, inheriting their original server speeds and energy consumption rates. In every subsequent iteration until all the positions of the first $\hat{K}$ servers have been mapped, the next remaining position levels from the remaining buffers, say m≤$\hat{K}$ positions, are mapped to the next m positions of the logically-combined queue in the order of the server labels.

Then, the $B_{\hat{K}+1}$ positions of server $\hat{K}+1$ are mapped to the following $B_{\hat{K}+1}$ positions of the logically-combined queue that are associated with server $\hat{K}+1$. The $B_{\hat{K}+2}$ positions of server if $\hat{K}+2$ are mapped to the following $B_{\hat{K}+2}$ positions of the logically-combined queue that are associated with server $\hat{K}+2$. The iterations terminate when all the positions of all server buffers have been mapped.

IV. Analysis

A rigorous analysis of the E* policy is provided below. In the following, E* is shown to always have a higher job throughput than that of MEESF. Also, conditions under which E* is guaranteed to outperform MEESF in terms of the energy efficiency of the system are derived.

For convenience, let $$P(n) = \frac{\pi^{E^*}(n)}{\pi^{E^*}(\tilde{B}_K)}, 0 \leq n \leq \tilde{B}_K. \tag{17}$$

Based on Equation (9), it can be derived for the E* policy that $$P(n) = \begin{cases} \prod_{i=n+1}^{\tilde{B}_K} \frac{\mu^{E^*}(i)}{\lambda}, & 0 \leq n \leq \tilde{B}_K - 1 \\ 1, & n = \tilde{B}_K. \end{cases} \tag{18}$$

Similarly, let $$P'(n) = \frac{\pi^{MEESF}(n)}{\pi^{MEESF}(\tilde{B}_K)}, 0 \leq n \leq \tilde{B}_K \tag{19}$$

and it can be obtained from Equation (9) for the MEESF policy that $$P'(n) = \begin{cases} \prod_{i=n+1}^{\tilde{B}_K} \frac{\mu^{MEESF}(i)}{\lambda}, & 0 \leq n \leq \tilde{B}_K - 1 \\ 1, & n = \tilde{B}_K. \end{cases} \tag{20}$$

Remark 2:

Because of the nature of the two policies, it can be determined that $$\begin{cases} \mu^{E^*}(n) > \mu^{MEESF}(n), & 2 \leq n \leq \tilde{B}_{\hat{K}} - 1 \\ \mu^{E^*}(n) = \mu^{MEESF}(n), & \text{elsewhere.} \end{cases} \tag{21}$$

Lemma 1:

For P(n) defined in the form of Equation (18) and P'(n) defined in the form of Equation (20), it can be determined that $$\begin{cases} P(n) > P'(n), & 0 \le n \le \tilde{B}_{\hat{K}-1} - 1 \\ P(n) = P'(n), & \tilde{B}_{\hat{K}-1} \le n \le \tilde{B}_K. \end{cases} \quad (22)$$

Proof: The result follows from Remark 2.

Proposition 2:

For the stochastic job assignment considered in the context of the present description, it can be determined that $$\mathcal{L}^{E^*} > \mathcal{L}^{MEESF}. \quad (23)$$

Proof: Using Equation (11), the job throughput of the system under the E* policy and that under the MEESF policy can be obtained respectively as $$\mathcal{L}^{E^*} = \lambda[1 - \pi^{E^*}(\tilde{B}_K)] \text{ and} \quad (24)$$

$$\mathcal{L}^{MEESF} = \lambda[1 - \pi^{MEESF}(\tilde{B}_K)]. \quad (25)$$

From Equation (17), we have for the E* policy that $$\pi^{E^*}(n) = P(n)\pi^{E^*}(\tilde{B}_K), \quad 0 \le n \le \tilde{B}_K - 1. \quad (26)$$

By normalization, $$\sum_{n=0}^{\tilde{B}_K - 1} P(n)\pi^{E^*}(\tilde{B}_K) + \pi^{E^*}(\tilde{B}_K) = 1 \quad (27)$$

and hence $$\pi^{E^*}(\tilde{B}_K) = \frac{1}{\sum_{n=0}^{\tilde{B}_K - 1} P(n) + 1}. \quad (28)$$

Likewise, from Equation (19), we have for the MEESF policy that $$\pi^{MEESF}(n) = P'(n)\pi^{MEESF}(\tilde{B}_K), \quad 0 \le n \le \tilde{B}_K - 1 \quad (29)$$

and hence obtain $$\pi^{MEESF}(\tilde{B}_K) = \frac{1}{\sum_{n=0}^{\tilde{B}_K - 1} P'(n) + 1}. \quad (30)$$

It follows from Lemma 1 that $$\sum_{n=0}^{\tilde{B}_K - 1} P(n) > \sum_{n=0}^{\tilde{B}_K - 1} P'(n). \quad (31)$$

Therefore, $$\pi^{E^*}(\tilde{B}_K) < \pi^{MEESF}(\tilde{B}_K) \quad (32)$$

and hence the result of Equation (23).

Lemma 2:

Given P(n) defined in the form of Equation (18) and P'(n) defined in the form of Equation (20), for any two integers x and y where x<y≤K, it can be determined that $$\sum_{n=\tilde{B}_{x-1}+1}^{\tilde{B}_K} P(n) \sum_{n'=\tilde{B}_{y-1}+1}^{\tilde{B}_K} P'(n') - \quad (33)$$

$$\sum_{n=\tilde{B}_{y-1}+1}^{\tilde{B}_K} P(n) \sum_{n'=\tilde{B}_{x-1}+1}^{\tilde{B}_K} P'(n') \begin{cases} > 0, & 1 \le x \le \hat{K} - 1 \\ = 0, & x \ge \hat{K}. \end{cases}$$

Proof: Note that $$\sum_{n=\tilde{B}_{x-1}+1}^{\tilde{B}_K} P(n) = \sum_{n=\tilde{B}_{x-1}+1}^{\tilde{B}_{y-1}} P(n) + \sum_{n=\tilde{B}_{y-1}+1}^{\tilde{B}_K} P(n) \quad (34)$$

and $$\sum_{n'=\tilde{B}_{x-1}+1}^{\tilde{B}_K} P'(n') = \sum_{n'=\tilde{B}_{x-1}+1}^{\tilde{B}_{y-1}} P'(n') + \sum_{n'=\tilde{B}_{y-1}+1}^{\tilde{B}_K} P'(n'). \quad (35)$$

Thus, proving Equation (33) is equivalent to proving $$\sum_{n=\tilde{B}_{x-1}+1}^{\tilde{B}_{y-1}} P(n) \sum_{n'=\tilde{B}_{y-1}+1}^{\tilde{B}_K} P'(n') - \quad (36)$$

$$\sum_{n=\tilde{B}_{y-1}+1}^{\tilde{B}_K} P(n) \sum_{n'=\tilde{B}_{x-1}+1}^{\tilde{B}_{y-1}} P'(n') \begin{cases} > 0, & 1 \le x \le \hat{K} - 1 \\ = 0, & x \ge \hat{K}. \end{cases}$$

It would suffice to show that, for any two integers l and m, where $\tilde{B}_{x-1}+1 \le l \le \tilde{B}_{y-1}$ and $\tilde{B}_{y-1}'+1 \le \overline{m} \le \tilde{B}_K$, $$P(l)P'(m) - P(m)P'(l) > 0 \quad (37)$$

or, equivalently, $$\frac{P(l)}{P(m)} = \prod_{i=l+1}^{m} \frac{\mu^{E^*}(i)}{\lambda} > \frac{P'(l)}{P'(m)} = \prod_{i=l+1}^{m} \frac{\mu^{MEESF}(i)}{\lambda} \quad (38)$$

If $l \le \tilde{B}_{\hat{K}-1} - 1$, then $$P(l)P'(m) - P(m)P'(l) - 0 \quad (39)$$

or, equivalently, $$\frac{P(l)}{P(m)} = \prod_{i=l+1}^{m} \frac{\mu^{E^*}(i)}{\lambda} = \frac{P'(l)}{P'(m)} = \prod_{i=l+1}^{m} \frac{\mu^{MEESF}(i)}{\lambda} \quad (40)$$

If $l \ge \tilde{B}_{\hat{K}-1}$. The inequality in Equation (38) and the equality in Equation (40) for all l in the defined range follow from Remark 2.

Proposition 3:

A sufficient condition for $$\frac{\mathcal{L}^{E^*}}{\mathcal{E}^{E^*}} > \frac{\mathcal{L}^{MEESF}}{\mathcal{E}^{MEESF}} \qquad (41)$$

to hold is that $$\frac{\mu_j}{\varepsilon_j} = \frac{\mu_1}{\varepsilon_1}, \quad j = 2, 3, \ldots, \hat{K} \qquad (42)$$

and there exists at least one pair of servers x and y, where $1 \le x \le \hat{K}$ and $x < y < K$, such that $\mu_x/\varepsilon_x > \mu_y/\varepsilon_y$.

Proof: From Equation (12), we derive for E* that $$\mathcal{E}^{E^*} = \sum_{n=1}^{\tilde{B}_K} \mathcal{E}^{E^*}(n) \pi^{E^*}(n) \qquad (43)$$

$$= \sum_{n=1}^{\hat{K}} \pi^{E^*}(n) \sum_{j=1}^{n} \varepsilon_j + \sum_{n=\hat{K}+1}^{\tilde{B}_{\hat{K}}} \pi^{E^*}(n) \sum_{j=1}^{\hat{K}} \varepsilon_j +$$

$$\sum_{i=\hat{K}+1}^{K} \sum_{n=\tilde{B}_{i-1}+1}^{\tilde{B}_i} \pi^{E^*}(n) \sum_{j=1}^{i} \varepsilon_j.$$

Interchanging the summations in Equation (43), the following can be obtained:

$$\mathcal{E}^{E^*} = \sum_{j=1}^{\hat{K}} \varepsilon_j \sum_{n=j}^{\hat{K}} \pi^{E^*}(n) + \sum_{j=1}^{\hat{K}} \varepsilon_j \sum_{n=\hat{K}+1}^{\tilde{B}_{\hat{K}}} \pi^{E^*}(n) + \qquad (44)$$

$$\left( \sum_{j=1}^{\hat{K}} \varepsilon_j \sum_{i=\hat{K}+1}^{K} + \sum_{j=\hat{K}+1}^{K} \varepsilon_j \sum_{i=j}^{K} \right) \sum_{n=\tilde{B}_{i-1}+1}^{\tilde{B}_i} \pi^{E^*}(n)$$

$$= \sum_{j=1}^{\hat{K}} \varepsilon_j \sum_{n=j}^{\tilde{B}_K} \pi^{E^*}(n) + \sum_{j=\hat{K}+1}^{K} \varepsilon_j \sum_{n=\tilde{B}_{j-1}+1}^{\tilde{B}_K} \pi^{E^*}(n).$$

Note that, since $B_j > 1$ for all j, $\tilde{B}_{j-1} + 1 \ge j$ for $1 \le j \le \hat{K}$. Thus, the elements of $\mathcal{E}^{E^*}$ in Equation (44) can be rewritten as $$\mathcal{E}^{E^*} = \sum_{j=1}^{\hat{K}} \varepsilon_j \sum_{n=j}^{\tilde{B}_{j-1}} \pi^{E^*}(n) + \sum_{j=1}^{\hat{K}} \varepsilon_j \sum_{n=\tilde{B}_{j-1}+1}^{\tilde{B}_K} \pi^{E^*}(n) + \qquad (45)$$

$$\sum_{j=\hat{K}+1}^{K} \varepsilon_j \sum_{n=\tilde{B}_{j-1}+1}^{\tilde{B}_K} \pi^{E^*}(n)$$

$$= \sum_{j=1}^{\hat{K}} \varepsilon_j \sum_{n=j}^{\tilde{B}_{j-1}} \pi^{E^*}(n) + \sum_{j=1}^{K} \varepsilon_j \sum_{n=\tilde{B}_{j-1}+1}^{\tilde{B}_K} \pi^{E^*}(n).$$

Similar to the way in which the expression of $\varepsilon^{E^*}$ in Equation (45) is derived, is $\mathcal{L}^{E^*}$ is defined as $$\mathcal{L}^{E^*} = \sum_{n=1}^{\tilde{B}_K} \mu^{E^*}(n) \pi^{E^*}(n) \qquad (46)$$

$$= \sum_{j=1}^{\hat{K}} \mu_j \sum_{n=j}^{\tilde{B}_{j-1}} \pi^{E^*}(n) + \sum_{j=1}^{K} \mu_j \sum_{n=\tilde{B}_{j-1}+1}^{\tilde{B}_K} \pi^{E^*}(n).$$

Then, using Equation (17), it can be determined that $$\frac{\mathcal{L}^{E^*}}{\mathcal{E}^{E^*}} = \frac{\mathcal{L}^{E^*}/\pi^{E^*}(\tilde{B}_K)}{\mathcal{E}^{E^*}/\pi^{E^*}(\tilde{B}_K)} \qquad (47)$$

$$= \frac{\sum_{j=1}^{\hat{K}} \mu_j \sum_{n=j}^{\tilde{B}_{j-1}} P(n) + \sum_{j=1}^{K} \mu_j \sum_{n=\tilde{B}_{j-1}+1}^{\tilde{B}_K} P(n)}{\sum_{j=1}^{\hat{K}} \varepsilon_j \sum_{n=j}^{\tilde{B}_{j-1}} P(n) + \sum_{j=1}^{K} \varepsilon_j \sum_{n=\tilde{B}_{j-1}+1}^{\tilde{B}_K} P(n)}.$$

On the other hand, from Equation (12), for MEESF it can be derived that $$\mathcal{E}^{MEESF} = \sum_{n'=1}^{\tilde{B}_K} \varepsilon^{MEESF}(n') \pi^{MEESF}(n') \qquad (48)$$

$$= \sum_{i'=1}^{K} \sum_{n'=\tilde{B}_{i'-1}+1}^{\tilde{B}_{i'}} \pi^{MEESF}(n') \sum_{j'=1}^{i'} \varepsilon_{j'}.$$

Interchanging the summations in Equation (48), it can be determined that $$\mathcal{E}^{MEESF} = \sum_{j'=1}^{K} \varepsilon_{j'} \sum_{i'=j'}^{K} \sum_{n'=\tilde{B}_{i'-1}+1}^{\tilde{B}_{i'}} \pi^{MEESF}(n') \qquad (49)$$

$$= \sum_{j'=1}^{K} \varepsilon_{j'} \sum_{n'=\tilde{B}_{j'-1}+1}^{\tilde{B}_K} \pi^{MEESF}(n').$$

Similar to the way the expression of $\varepsilon^{MEESF}$ is derived, $\mathcal{L}^{MEESF}$ can be obtained as $$\mathcal{L}^{MEESF} = \sum_{n'=1}^{\tilde{B}_K} \mu^{MEESF}(n') \pi^{MEESF}(n') \qquad (50)$$

$$= \sum_{j'=1}^{K} \mu_{j'} \sum_{n'=\tilde{B}_{j'-1}+1}^{\tilde{B}_K} \pi^{MEESF}(n').$$

Using equation (19), it can be determined that $$\frac{\mathcal{L}^{MEESF}}{\mathcal{E}^{MEESF}} = \frac{\mathcal{L}^{MEESF}/\pi^{MEESF}(\tilde{B}_K)}{\mathcal{E}^{MEESF}/\pi^{MEESF}(\tilde{B}_K)} \qquad (51)$$

$$= \frac{\sum_{j'=1}^{K} \mu_{j'} \sum_{n'=\tilde{B}_{j'-1}+1}^{\tilde{B}_K} P'(n')}{\sum_{j'=1}^{K} \varepsilon_{j'} \sum_{n'=\tilde{B}_{j'-1}+1}^{\tilde{B}_K} P'(n')}.$$

Clearly, $\mathcal{L}^{E^*}/\varepsilon^{E^*}$ given in the form of Equation (47) and $\mathcal{L}^{MEESF}/\varepsilon^{MEESF}$ in the form of Equation (51), for the inequality in Equation (41) to hold, it requires that $$\sum_{j=1}^{\hat{K}} \sum_{j'=1}^{K} \mu_j \varepsilon_{j'} \sum_{n=j}^{\tilde{B}_{j-1}} P(n) \sum_{n'=\tilde{B}_{j'-1}+1}^{\tilde{B}_K} P'(n') + \qquad (52)$$

$$\sum_{j=1}^{K} \sum_{j'=1}^{K} \mu_j \varepsilon_{j'} \sum_{n=\tilde{B}_{j-1}+1}^{\tilde{B}_K} P(n) \sum_{n'=\tilde{B}_{j'-1}+1}^{\tilde{B}_K} P'(n') >$$

$$\sum_{j=1}^{\hat{K}} \sum_{j'=1}^{K} \varepsilon_j \mu_{j'} \sum_{n=j}^{\tilde{B}_{j-1}} P(n) \sum_{n'=\tilde{B}_{j'-\lambda}+1}^{\tilde{B}_K} P'(n') +$$

$$\sum_{j=1}^{K} \sum_{j'=1}^{K} \varepsilon_j \mu_{j'} \sum_{n=\tilde{B}_{j-1}+1}^{\tilde{B}_K} P(n) \sum_{n'=\tilde{B}_{j'-1}+1}^{\tilde{B}_K} P'(n').$$

First, it can be shown that $$\sum_{j=1}^{K} \sum_{j'=1}^{K} \mu_j \varepsilon_{j'} \sum_{n=\tilde{B}_{j-1}+1}^{\tilde{B}_K} P(n) \sum_{n'=\tilde{B}_{j'-1}+1}^{\tilde{B}_K} P'(n') > \qquad (53)$$

$$\sum_{j=1}^{K} \sum_{j'=1}^{K} \varepsilon_j \mu_{j'} \sum_{n=\tilde{B}_{j-1}+1}^{\tilde{B}_K} P(n) \sum_{n'=\tilde{B}_{j'-1}+1}^{\tilde{B}_K} P'(n').$$

It can be observed from Equation (53) that:

For $j = j'$:

$$\mu_j \varepsilon_{j'} \sum_{n=\tilde{B}_{j-1}+1}^{\tilde{B}_K} P(n) \sum_{n'=\tilde{B}_{j'-1}+1}^{\tilde{B}_K} P'(n') = \qquad (54)$$

$$\varepsilon_j \mu_{j'} \sum_{n=\tilde{B}_{j-1}+1}^{\tilde{B}_K} P(n) \sum_{n'=\tilde{B}_{j'-1}+1}^{\tilde{B}_K} P'(n').$$

For any two integers x and y where $1 \le x < y \le K$:

$$\mu_x \varepsilon_y \sum_{n=\tilde{B}_{x-1}+1}^{\tilde{B}_K} P(n) \sum_{n'=\tilde{B}_{y-1}+1}^{\tilde{B}_K} P'(n') + \qquad (55)$$

$$\mu_y \varepsilon_x \sum_{n=\tilde{B}_{y-1}+1}^{\tilde{B}_K} P(n) \sum_{n'=\tilde{B}_{x-1}+1}^{\tilde{B}_K} P'(n') -$$

$$\varepsilon_x \mu_y \sum_{n=\tilde{B}_{x-1}+1}^{\tilde{B}_K} P(n) \sum_{n'=\tilde{B}_{y-1}+1}^{\tilde{B}_K} P'(n') -$$

$$\varepsilon_y \mu_x \sum_{n=\tilde{B}_{y-1}+1}^{\tilde{B}_K} P(n) \sum_{n'=\tilde{B}_{x-1}+1}^{\tilde{B}_K} P'(n') =$$

$$(\mu_x \varepsilon_y - \varepsilon_x \mu_y) \left[ \sum_{n=\tilde{B}_{x-1}+1}^{\tilde{B}_K} P(n) \sum_{n'=\tilde{B}_{y-1}+1}^{\tilde{B}_K} P'(n') - \sum_{n=\tilde{B}_{y-1}+1}^{\tilde{B}_K} P(n) \sum_{n'=\tilde{B}_{x-1}+1}^{\tilde{B}_K} P'(n') \right].$$

It follows from Lemma 2 that the right hand side of Equation (55)

$$\begin{cases} > 0, & 1 \le x \le \hat{K} - 1 \\ = 0, & x \ge \hat{K}. \end{cases}$$

where the inequality holds if $\mu_x/\varepsilon_x > \mu_y/\varepsilon_y$.

For the inequality in Equation (52) to hold, it is sufficient to have $$\sum_{j=1}^{\hat{K}} \sum_{j'=1}^{K} \mu_j \varepsilon_{j'} \sum_{n=j}^{\tilde{B}_{j-1}} P(n) \sum_{n'=\tilde{B}_{j'-1}+1}^{\tilde{B}_K} P'(n') \ge \qquad (56)$$

$$\sum_{j=1}^{\hat{K}} \sum_{j'=1}^{K} \varepsilon_j \mu_{j'} \sum_{n=j}^{\tilde{B}_{j-1}} P(n) \sum_{n'=\tilde{B}_{j'-1}+1}^{\tilde{B}_K} P'(n').$$

It can be observed from Equation (56) that
For j=j': $\mu_j \varepsilon_j' = \varepsilon_j \mu_j'$;
For j=1, 2, . . . , $\hat{K}$, and j'=j+1, j+2, . . . , K: $\mu_j \varepsilon_j' - \varepsilon_j \mu_j' \ge 0$
For j=2, 3, . . . , $\hat{K}$, and j'=1, 2, . . . , j−1: $\mu_j \varepsilon_j' - \varepsilon_j \mu_j' \le 0$.

Thus, for the inequality in Equation (56) to hold, it is sufficient to have Equation (42), which enforces $$\mu_j \varepsilon_{j'} - \varepsilon_j \mu_{j'} = 0, j=2,3,\ldots,\hat{K}, j'=1,2,\ldots,j-1 \qquad (57)$$

This completes the proof.
Based on Proposition 3, the following corollary can be obtained:
Corollary 1:
If $\mu_j/\varepsilon_j = c$ for j=1, 2, . . . , K, then $$\frac{\mathcal{L}^{E^*}}{\varepsilon^{E^*}} = \frac{\mathcal{L}^{MEESF}}{\varepsilon^{MEESF}}. \qquad (58)$$

Corollary 1 suggests that, if all servers in the system are equally energy efficient, the energy efficiency of the system under the E* policy is equivalent to that under the MEESF policy. Nevertheless, even in such case of a homogeneous server farm, E* is guaranteed to yield a higher job throughput than that of MEESF. On the other hand, Proposition 3 suggests that, if at least two servers in a heterogeneous server farm are equally most energy efficient, E* is guaranteed to outperform MEESF in terms of the energy efficiency of the system. The latter is a realistic scenario since in practice a server farm is likely to comprise multiple servers of the same type purchased at a time.

V. Experimental/Numerical Results

Provided in the following are extensive numerical results for demonstrating the effectiveness of the E* policy and the RM E* policy in some embodiments of the present invention. For convenience of describing the experiment setting, the offered traffic per server in the system is denoted by $$\rho = \lambda \bigg/ \sum_{j=1}^{K} \mu_j.$$

A. Verification of the Exact Analysis

In the following experiment, a system with four servers was considered. In one example, $\rho$ was set at 0.8, and for each server the buffer size $B_j$ is set to 3. A sequence of K random deviates according to a Pareto distribution with unit mean was generated and was arranged in a non-increasing order of values. The energy efficiency $\mu_j/\varepsilon_j$ of server j is set as the j-th value in the ordered sequence. The energy consumption rate of server j is chosen to be $\varepsilon_j=10+j^2$, from which the service rate $\mu_j$ of server j can be obtained using the corresponding energy efficiency value.

Figure 6:
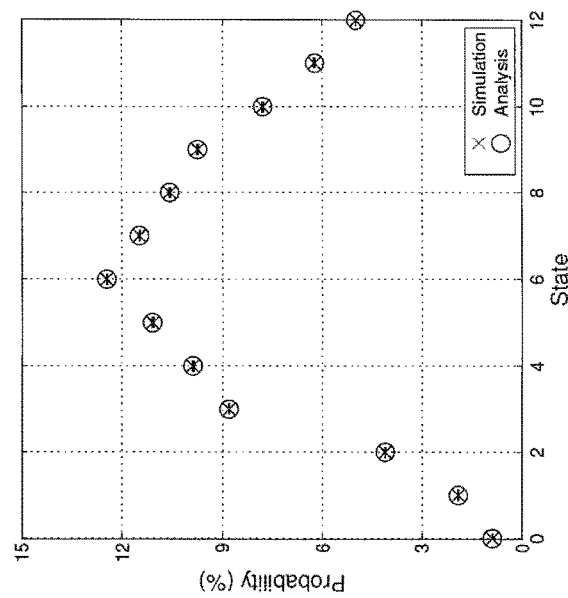
FIG. 6 is a graph showing simulation and analytical results (in terms of probability) for a stationary distribution of the number of jobs in a server farm implementing the MEESF job assignment policy.

FIG. 6 provides both simulation results and exact analytical results for the stationary distribution of the number of jobs in the system under the MEESF policy. The simulation results are obtained from the multi-queue system with exponential job size distribution, and presented in the form of an observed mean from ten independent runs of the experiment. The confidence intervals at the 95% level based on the Student's t-distribution are found to be within ±0.4% of the observed mean. The analytical results were obtained from the logically-combined queue by solving the steady-state equations of the Markov chain presented in FIG. 5. FIG. 6 shows that the analytical results are all within the simulation confidence intervals, demonstrating a clear agreement between the simulation and the exact analysis.

B. Effectiveness of E*

The effectiveness of the E* policy was demonstrated by comparing with other policies such that a baseline MEESF policy as well as an optimal policy under various system parameters. First the special case in which the energy consumption rate of each server j is related to its service rate by $\varepsilon_j=\mu_j^3$ was considered. With this setting the MEESF policy may be considered equivalent to the SSF policy described above.

For the set of experiments in FIGS. 7A-8B, the following parameters were used: a system with 100 servers; the service rate of each server j is $\mu_j=0.1j$.

Figure 7A:
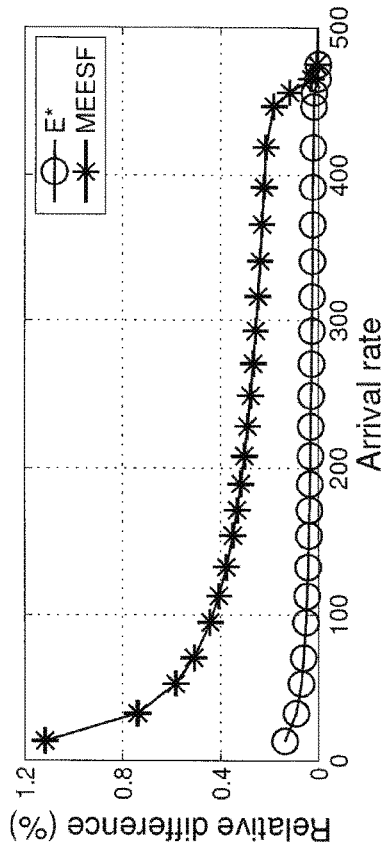
FIG. 7A is a graph showing an experimental result of relative difference to the optimal solution in energy efficiency against job arrival rate for a server farm implementing the E* job assignment policy in one embodiment of the present invention and for the same server farm implementing the "most-energy-efficient-server-first (MEESF)" job assignment policy (for the case where in the server farm, energy consumption rate $\varepsilon_j$ of each server is related to its service rate $\mu_j$ by $\varepsilon_j = \mu_j^3$)
Figure 7B:
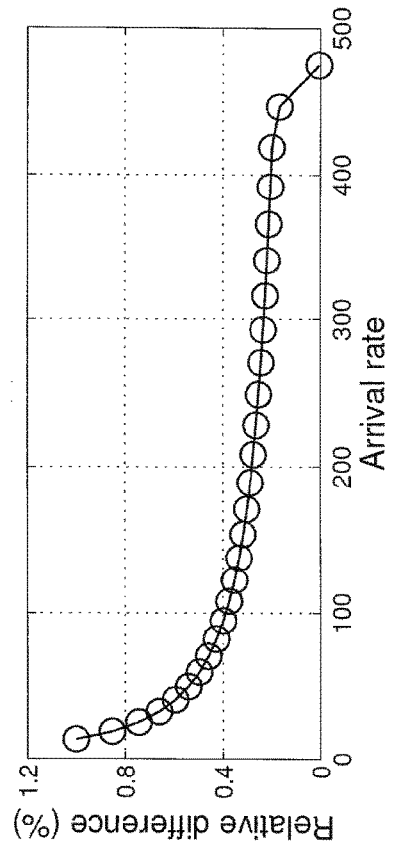
FIG. 7B is a graph showing a relative difference in energy efficiency of a server farm implementing the E* job assignment policy in one embodiment of the present invention to the same server farm implementing the "most-energy-efficient-server-first (MEESF)" job assignment policy, based on FIG. 7A (for the case where in the server farm, energy consumption rate $\varepsilon_j$ of each server is related to its service rate $\mu_j$ by $\varepsilon_j=\mu_j^3$)
Figure 8A:
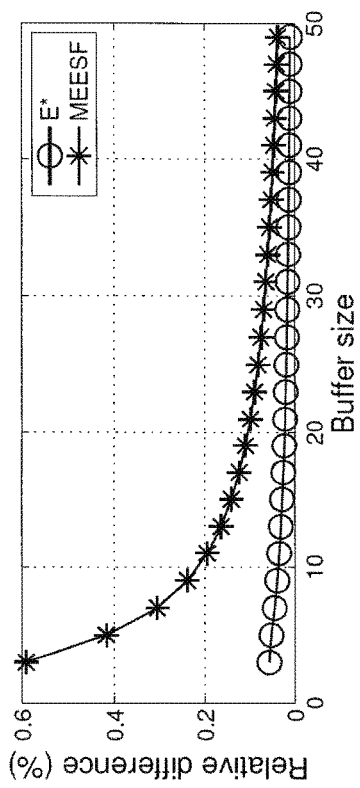
FIG. 8A is a graph showing an experimental result of relative difference to the optimal solution in energy efficiency against buffer size for a server farm implementing the E* job assignment policy in one embodiment of the present invention and for the same server farm implementing the "most-energy-efficient-server-first (MEESF)" job assignment policy (for the case where in the server farm, energy consumption rate $\varepsilon_j$ of each server is related to its service rate $\mu_j$ by $\varepsilon_j=\mu_j^3$)
Figure 8B:
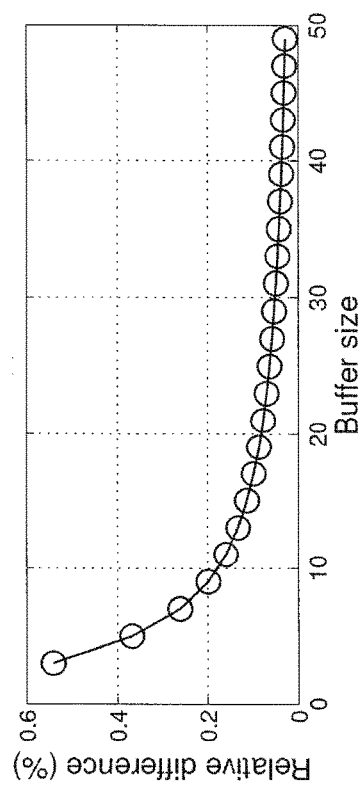
FIG. 8B is a graph showing a relative difference in energy efficiency of a server farm implementing the E* job assignment policy in one embodiment of the present invention to the same server farm implementing the "most-energy-efficient-server-first (MEESF)" job assignment policy, based on FIG. 8A (for the case where in the server farm, energy consumption rate $\varepsilon_j$ of each server is related to its service rate $\mu_j$ by $\varepsilon_j=\mu_j^3$)

FIGS. 7A and 7B were obtained with the buffer size $B_j=10$ for each server j and the job arrival rate $\lambda$ varied from $\mu_1$ to $\mu_1+\mu_2+ \ldots +\mu_{100}$. In FIGS. 8A-8B, $\rho$ is set at 0.8 and all servers have the same buffer size which is varied from 3 to 49 at a step of 2.

It can be observed from FIGS. 7A and 8A that both MEESF and E* are close to the optimal policy in terms of the energy efficiency of the system, with relative difference less than 1.2% and 0.3%, respectively. It can also be observed that in FIGS. 7B and 8B E* outperforms MEESF in all experiments, although the improvement is only up to 1% in this special case. These observations are consistent with the above analysis and the some aspects of the present invention.

Figure 9A:
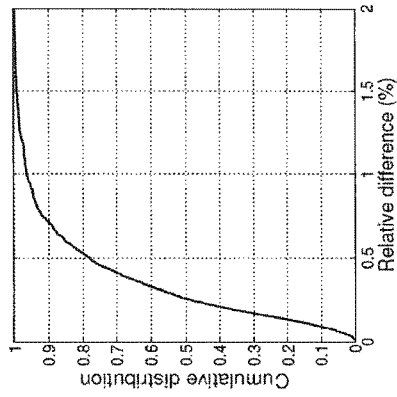
FIG. 9A is a graph showing a cumulative distribution of the relative difference in energy efficiency of the server farm implementing the E* job assignment policy in one embodiment of the present invention to the same server farm implementing the "most-energy-efficient-server-first (MEESF)" job assignment policy (for the case where in the server farm, energy consumption rate $\varepsilon_j$ of each server is related to its service rate $\mu_j$ by $\varepsilon_j=\mu_j^3$; and assuming the offered traffic per server in the server farm equals to 0.4)
Figure 9B:
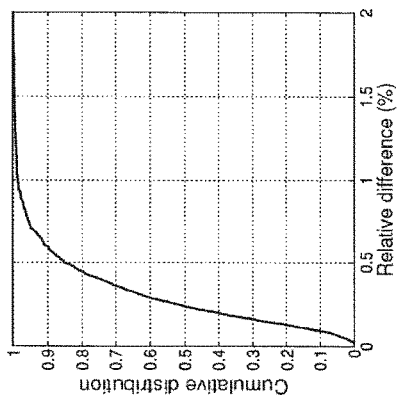
FIG. 9B is a graph showing a cumulative distribution of the relative difference in energy efficiency of the server farm implementing the E* job assignment policy in one embodiment of the present invention to the same server farm implementing the "most-energy-efficient-server-first (MEESF)" job assignment policy (for the case where in the server farm, energy consumption rate $\varepsilon_j$ of each server is related to its service rate $\mu_j$ by $\varepsilon_j=\mu_j^3$; and assuming the offered traffic per server in the server farm equals to 0.6)
Figure 9C:
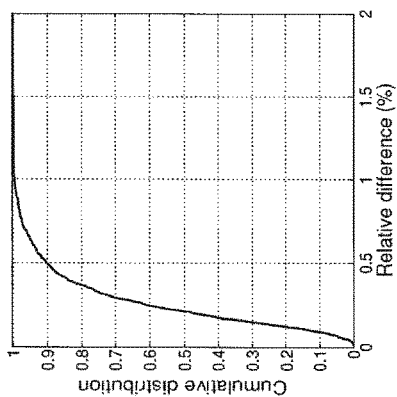
FIG. 9C is a graph showing a cumulative distribution of the relative difference in energy efficiency of the server farm implementing the E* job assignment policy in one embodiment of the present invention to the same server farm implementing the "most-energy-efficient-server-first (MEESF)" job assignment policy (for the case where in the server farm, energy consumption rate $\varepsilon_j$ of each server is related to its service rate $\mu_j$ by $\varepsilon_j=\mu_j^3$; and assuming the offered traffic per server in the server farm equals to 0.8)

For the set of experiments in FIGS. 9A-9C, a system with 50 servers was used. For each server j, its buffer size $B_j$ was randomly chosen from the set $\{10, 11, \ldots, 15\}$, and its service rate $\mu_j$ was randomly generated from the range $\{0.1, 10\}$ and arranged in a non-decreasing order. For each such random configuration of server speed, the job arrival rate was set so that $\rho=0.4$ (case 1), 0.6 (case 2) and 0.8 (case 3) respectively.

E* and MEESF policies were compared in terms of the energy efficiency of the system. Results obtained from 1000 experiments were plotted in FIGS. 9A-9C in the form of cumulative distribution of the relative difference. From these results, it can be observed that the results for the two policies are consistent with those found in FIGS. 7A-8B for the special case (the energy consumption rate of each server j is related to its service rate by $\varepsilon_j=\mu_j^3$).

Next, a more general case where the energy consumption rate of each server and its service rate do not necessarily follow the assumption of Equation (2) was considered. As shown below, although the improvement of E* over MEESF in terms of the energy efficiency of the system is very limited in the special case, it can be significantly improved in the general case with independently and randomly generated service rates and energy consumption rates.

In this set of experiments for the general case, a system with 50 servers categorized into ten server groups was used. Each server group i, i=1, 2, ..., 10, consists of five servers that have the same service rate, energy consumption rate and buffer size, denoted by $\bar{\mu}_i$, $\bar{\varepsilon}_i$, and $\bar{B}_i$ respectively. A set of ratios $r_i$, i=2, 3, ..., 10 from the range [0.1, 1] were randomly generated.

With $\bar{\mu}_1/\bar{\varepsilon}_1=100$, the energy efficiency of each server in server group i is set to be $\bar{\mu}_i/\bar{\varepsilon}_i=r_i^\alpha \cdot \bar{\mu}_{i-1}/\bar{\varepsilon}_{i-1}$, i=2, 3, ..., 10. In this example, three cases were considered with $\alpha=1$ (case 1), $\alpha=1.2$ (case 2), and $\alpha=1.4$ (case 3). Different values of $\alpha$ in the context of the present invention relates to levels of server heterogeneity.

The set of service rates $\bar{\mu}_i$ was randomly generated from the range [0.1, 10] and was arranged in an non-increasing order. The set of buffer sizes $\bar{B}_i$ was also randomly chosen from $\{10, 11, \ldots, 15\}$.

Such a setting can be justified in a way that a more recently purchased server is likely to have a higher service rate and a higher energy efficiency. In practice, a server farm is likely to comprise multiple servers of the same type purchased at a time.

Figure 10A:
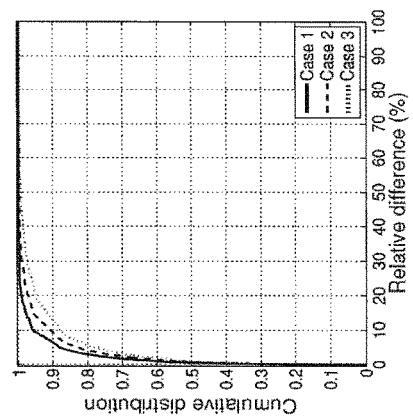
FIG. 10A is a graph showing a cumulative distribution of the relative difference in energy efficiency of the server farm implementing the E* job assignment policy in one embodiment of the present invention to the same server farm implementing the "most-energy-efficient-server-first (MEESF)" job assignment policy (for general cases 1-3 of different server heterogeneity; assuming the offered traffic per server in the server farm equals to 0.4)
Figure 10B:
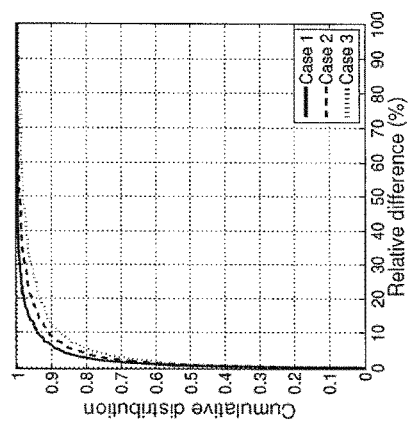
FIG. 10B is a graph showing a cumulative distribution of the relative difference in energy efficiency of the server farm implementing the E* job assignment policy in one embodiment of the present invention to the same server farm implementing the "most-energy-efficient-server-first (MEESF)" job assignment policy (for general cases 1-3 of different server heterogeneity; assuming the offered traffic per server in the server farm equals to 0.6)
Figure 10C:
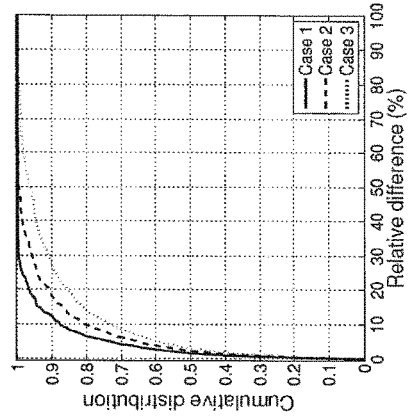
FIG. 10C is a graph showing a cumulative distribution of the relative difference in energy efficiency of the server farm implementing the E* job assignment policy in one embodiment of the present invention to the same server farm implementing the "most-energy-efficient-server-first (MEESF)" job assignment policy (for general cases 1-3 of different server heterogeneity; assuming the offered traffic per server in the server farm equals to 0.8)
Figure 11A:
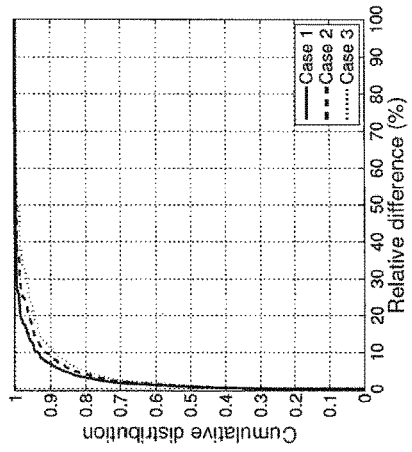
FIG. 11A is a graph showing a cumulative distribution of the relative difference in energy efficiency of the server farm implementing the E* job assignment policy in one embodiment of the present invention to the same server farm implementing a rate-matching E* job assignment policy (for general cases 1-3 of different server heterogeneity; assuming the offered traffic per server in the server farm equals to 0.4)
Figure 11B:
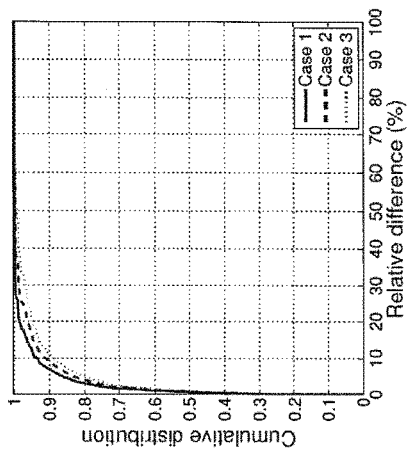
FIG. 11B is a graph showing a cumulative distribution of the relative difference in energy efficiency of the server farm implementing the E* job assignment policy in one embodiment of the present invention to the same server farm implementing a rate-matching E* job assignment policy (for general cases 1-3 of different server heterogeneity; assuming the offered traffic per server in the server farm equals to 0.6)
Figure 11C:
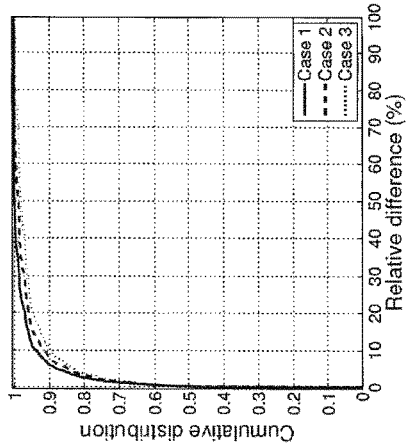
FIG. 11C is a graph showing a cumulative distribution of the relative difference in energy efficiency of the server farm implementing the E* job assignment policy in one embodiment of the present invention to the same server farm implementing a rate-matching E* job assignment policy (for general cases 1-3 of different server heterogeneity; assuming the offered traffic per server in the server farm equals to 0.8)

Results in FIGS. 10A-10C were obtained from 1000 experiments and were plotted in the form of cumulative distribution of the relative difference of E* to MEESF in terms of the energy efficiency of the system. From the figures, it can be observed that in such a general case, E* significantly outperforms MEESF by up to 100%, which is a substantial improvement of the performance compared to merely 2% in FIGS. 9A-9C for the special case. It can also be observed from FIG. 10C that E* outperforms MEESF by more than 10% in nearly 27% of the experiments for case 3. FIGS. 10A-10C also show that as the level of server heterogeneity becomes higher, the performance improvement of E* over MEESF becomes larger.

C. Effectiveness of RM

Next, the effectiveness of the rate matched E* policy was compared with the E* policy using the same experiment settings for the general case in FIGS. 10A-10C. Results were plotted in FIGS. 11A-11C in the form of cumulative distribution of the relative difference of E* to RM E* in terms of the energy efficiency of the system. It can be observed that in all cases the relative difference is less than 5% in nearly 80% of the experiments. It can also be observed that the relative difference is not very sensitive to the value of $\rho$ and the level of server heterogeneity.

Figure 12A:
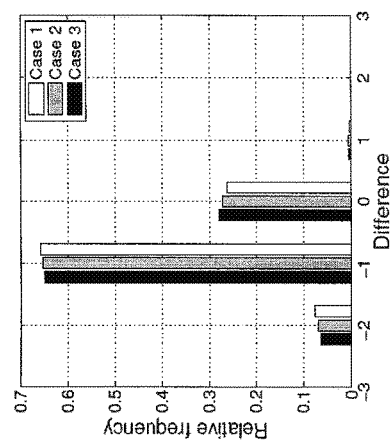
FIG. 12A is a graph showing a histogram related to a difference between the number of servers selected to form a virtual server by the E* job assignment policy and the number of servers selected to form a virtual server by the rate-matching E* job assignment policy (for general cases 1-3 of different server heterogeneity; assuming the offered traffic per server in the server farm equals to 0.4)
Figure 12B:
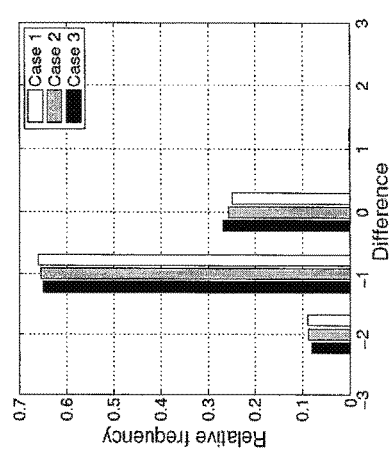
FIG. 12B is a graph showing a histogram related to a difference between the number of servers selected to form a virtual server by the E* job assignment policy and the number of servers selected to form a virtual server by the rate-matching E* job assignment policy (for general cases 1-3 of different server heterogeneity; assuming the offered traffic per server in the server farm equals to 0.6)
Figure 12C:
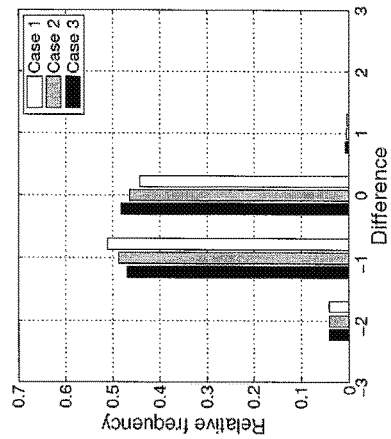
FIG. 12C is a graph showing a histogram related to a difference between the number of servers selected to form a virtual server by the E* job assignment policy and the number of servers selected to form a virtual server by the rate-matching E* job assignment policy (for general cases 1-3 of different server heterogeneity; assuming the offered traffic per server in the server farm equals to 0.8).

FIGS. 12A-12C are the histogram of the difference between $\hat{K}^*$ and $\hat{K}^{RM}$, i.e., $\hat{K}^*-\hat{K}^{RM}$, obtained from the corresponding experiments for each value of $\rho$ and each level of server heterogeneity. It can be observed from FIGS. 12A-12C that the difference between $\hat{K}^*$ and $\hat{K}^{RM}$ varies within a small range of $\{-3, -2, \ldots, 1\}$. Also, in FIGS. 12A-12C, as the value of $\rho$ grows from 0.6-0.8, the variance of the distribution of $\hat{K}^*-\hat{K}^{RM}$ decreases. This demonstrates that the optimal value $\hat{K}^*$ is likely to be within a small range of $\hat{K}$ values defined by the empirical value $\hat{K}^{RM}$. Therefore, the performance of the RM E* policy can be further improved by attempting each value of $\hat{K}$ within such a significantly reduced range.

VI. Conclusion

In embodiments of the present invention, there is provided a new approach that gives rise to an insensitive job-assignment policy for the popular server farm model comprising a parallel system of finite-buffer PS queues with heterogeneous server speeds and energy consumption rates. Unlike the straightforward MEESF approach that greedily chooses the most energy-efficient servers for job assignment, one important feature of the more robust E* policy is to aggregate an optimal number of most energy-efficient servers as a virtual server. E* is designed to give preference to this virtual server and utilize its service capacity in such a way that both the job throughput and the energy efficiency of the system can be improved.

In the above description, a detailed analysis of the E* policy has been provided. It has been shown that E* has always a higher job throughput than that of MEESF and there exist realistic and sufficient conditions under which E* is guaranteed to outperform MEESF in terms of the energy efficiency of the system.

In some embodiments of the present invention, it would be advantageous to form the virtual server by simply matching its aggregate service rate to the job arrival rate. Extensive experiments based on random settings have confirmed the effectiveness of the resulting RM E* policy. Noting that the fundamentally important model of parallel PS queues has broader applications in communication systems, the method provided in embodiments of the present invention allows for insensitive energy-efficient job assignment, which potentially has a wide range of applications in green communications and networking.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for operating a server farm with a plurality of servers operably connected with each other, comprising the steps of:

defining a virtual server by selectively joining two or more of the servers with the highest energy efficiency values, wherein the energy efficiency value is defined as the ratio of job throughput to power consumption;

receiving a job request of a computational task to be handled by the server farm; and assigning the computational task to one of the plurality of servers for processing based on a job assignment policy, the job assignment policy being arranged to give preference to assigning the computational task to the servers of the virtual server for processing so as to maximize an energy efficiency of the server farm;

wherein the job assignment policy is arranged to reassign a computational task being handled by one of the plurality of servers to another one of the plurality of servers that is more energy efficient, before the computational task is completed;

ensure that none of the servers of the virtual server is idle if a server with a lower energy efficiency value in the virtual server is busy; and ensure that none of the servers other than those of the virtual server is busy if a server with a higher energy efficiency value has at least one vacant slot in its buffer.

2. The method in accordance with claim 1, further comprising the steps of:

monitoring a number or a rate of job request of computational task received; and updating a definition of the virtual server by adjusting the number of servers defining the virtual server based on the monitoring result.

3. The method in accordance with claim 1, wherein the plurality of servers each includes a finite buffer for queuing job requests, and the server farm is finite-buffer processor-sharing server farm.

4. The method in accordance with claim 1, wherein the job assignment policy is arranged to give preference to assigning the computational task to one of the servers of the virtual server with at least one vacant slot in its buffer.

5. The method in accordance with claim 1, wherein the job assignment policy is arranged to reassign a computational task being handled by a server in the virtual server to another server in the virtual server with buffer vacancy before the computational task is completed.

6. The method in accordance with claim 1, wherein the job assignment policy is arranged to ensure that none of the servers of the virtual server handles more than one computational task if any of the servers of the virtual server is idle.

7. The method in accordance with claim 1, wherein the virtual server is formed by at least two servers with the highest efficiency values in the server farm.

8. The method in accordance with claim 1, wherein the number of servers of the virtual server is selected such that an aggregate service rate of the virtual server is less than or equal to an arrival rate of the job requests; the aggregate service rate of the virtual server being defined as a sum of service rate of each server in the virtual server.

9. The method in accordance with claim 1, wherein the number of servers of the virtual server is selected such that an aggregate service rate of the virtual server substantially matches an average arrival rate of the job requests; the aggregate service rate of the virtual server being defined as a sum of service rate of each server in the virtual server.

10. The method in accordance with claim 1, further comprising the step of sorting the plurality of servers according to a respective energy efficiency value associated with each of the plurality of servers prior to defining the virtual server.

11. A system for operating a server farm with a plurality of servers operably connected with each other, the system comprising one or more processors arranged to:
define a virtual server by selectively joining two or more of the servers with the highest energy efficiency value, wherein the energy efficiency value is defined as the ratio of job throughput to power consumption;
receive a job request of a computational task to be handled by the server farm; and
assign the computational task to one of the plurality of servers for processing based on a job assignment policy programmed to be operated in the one or more processors, the job assignment policy being arranged to give preference to assigning the computational task to the servers of the virtual server for processing so as to maximize an energy efficiency of the server farm;
wherein the job assignment policy is arranged to
reassign a computational task being handled by one of the plurality of servers to another one of the plurality of servers that is more energy efficient, before the computational task is completed;
ensure that none of the servers of the virtual server is idle if a server with a lower energy efficiency value in the server is busy; and
ensure that none of the servers other than those of the virtual server is busy is a server with a higher energy efficiency value has at least one vacant slot in its buffer.

12. The system in accordance with claim 11, wherein the one or more processors are further arranged to:
monitor a number or a rate of job request of computational task received; and
update a definition of the virtual server by adjusting the number of servers defining the virtual server based on the monitoring result.

13. The system in accordance with claim 11, wherein the plurality of servers each includes a finite buffer for queuing job requests, and the server farm is finite-buffer processor-sharing server farm.

14. The system in accordance with claim 11, wherein the job assignment policy is arranged to give preference to assigning the computational task to one of the servers of the virtual server with at least one vacant slot in its buffer.

15. The system in accordance with claim 11, wherein the job assignment policy is arranged to reassign a computational task being handled by a server in the virtual server to another server in the virtual server with buffer vacancy before the computational task is completed.

16. The system in accordance with claim 11, wherein the job assignment policy is arranged to ensure that none of the servers of the virtual server handles more than one computational task if any of the servers of the virtual server is idle.

17. The system in accordance with claim 11, wherein the virtual server is formed by at least two servers with the highest efficiency values in the server farm.

18. The system in accordance with claim 11, wherein the number of servers of the virtual server is selected such that an aggregate service rate of the virtual server is less than or equal to an arrival rate of the job requests; the aggregate service rate of the virtual server being defined as a sum of service rate of each server in the virtual server.

19. The system in accordance with claim 11, wherein the number of servers of the virtual server is selected such that an aggregate service rate of the virtual server substantially matches an average arrival rate of the job requests; the aggregate service rate of the virtual server being defined as a sum of service rate of each server in the virtual server.

20. The system in accordance with claim 11, wherein the one or more processors are one or more servers in the server farm.

21. A non-transient computer readable medium for storing computer instructions that, when executed by one or more processors, causes the one or more processors to perform a method for operating a server farm with a plurality of servers operably connected with each other, the method comprising the steps of:
defining a virtual server by selectively joining two or more of the servers with the highest energy efficiency values, wherein the energy efficiency value is defined as the ratio of job throughput to power consumption;
receiving a job request of a computational task to be handled by the server farm; and assigning the computational task to one of the plurality of servers for processing based on a job assignment policy, the job assignment policy being arranged to give preference to assigning the computational task to the servers of the virtual server for processing so as to maximize an energy efficiency of the server farm;
wherein the job assignment policy is arranged to
reassign a computational task being handled by one of the plurality of servers to another one of the plurality of servers that is more energy efficient, before the computational task is completed;
ensure that none of the servers of the virtual server is idle if a server with a lower energy efficiency value in the virtual server is busy; and
ensure that none of the servers other than those of the virtual server is busy if a server with a higher energy efficiency value has at least one vacant slot in its buffer.

22. The system in accordance with claim 11, wherein the one or more processors are further arranged to sort the plurality of servers according to a respective energy efficiency value associated with each of the plurality of servers prior to defining the virtual server.

* * * * *